US012269263B2

(12) United States Patent
Ide et al.

(10) Patent No.: US 12,269,263 B2
(45) Date of Patent: Apr. 8, 2025

(54) LIQUID DISCHARGE APPARATUS AND CAPACITIVE LOAD DRIVE CIRCUIT

(71) Applicant: SEIKO EPSON CORPORATION, Tokyo (JP)

(72) Inventors: Noritaka Ide, Shiojriri (JP); Kunio Tabata, Shiojiri (JP)

(73) Assignee: SEIKO EPSON CORPORATION (JP)

(*) Notice: Subject to any disclaimer, the term of this patent is extended or adjusted under 35 U.S.C. 154(b) by 191 days.

(21) Appl. No.: 18/187,953

(22) Filed: Mar. 22, 2023

(65) Prior Publication Data

US 2023/0302791 A1 Sep. 28, 2023

(30) Foreign Application Priority Data

Mar. 23, 2022 (JP) ................................ 2022-046478

(51) Int. Cl.
*B41J 2/045* (2006.01)

(52) U.S. Cl.
CPC ......... *B41J 2/0457* (2013.01); *B41J 2/04541* (2013.01); *B41J 2/0455* (2013.01); *B41J 2/04581* (2013.01)

(58) Field of Classification Search
CPC .... B41J 2/0457; B41J 2/04541; B41J 2/0455; B41J 2/04581
See application file for complete search history.

(56) References Cited

U.S. PATENT DOCUMENTS

2005/0231179 A1* 10/2005 Ishizaki ............... B41J 2/04581 323/234
2022/0169012 A1* 6/2022 Ide ....................... B41J 2/04588

FOREIGN PATENT DOCUMENTS

JP 2010-124040 A 6/2010

* cited by examiner

Primary Examiner — Jason S Uhlenhake
(74) *Attorney, Agent, or Firm* — Harness, Dickey & Pierce, P.L.C.

(57) ABSTRACT

A liquid discharge apparatus in which a level shift circuit executes, one or a plurality of times according to a voltage value of a capacitor included in a bootstrap circuit detected by a voltage detection circuit, a second control of outputting a third gate signal for controlling a third transistor to be non-conductive and a fourth gate signal for controlling a fourth transistor to be conductive, and then, outputting the third gate signal for controlling the third transistor to be conductive and the fourth gate signal for controlling the fourth transistor to be non-conductive.

11 Claims, 9 Drawing Sheets

LIQUID DISCHARGE APPARATUS AND CAPACITIVE LOAD DRIVE CIRCUIT

The present application is based on, and claims priority from JP Application Serial Number 2022-046478, filed Mar. 23, 2022, the disclosure of which is hereby incorporated by reference herein in its entirety.

BACKGROUND

1. Technical Field

The present disclosure relates to a liquid discharge apparatus and a capacitive load drive circuit.

2. Related Art

As a liquid discharge apparatus that discharges a liquid to form an image or a document on a medium, a liquid discharge apparatus using a capacitive load such as a piezoelectric element is known. In such a liquid discharge apparatus, the capacitive load is provided corresponding to each of a plurality of nozzles that discharge the liquid, and each is driven according to a drive signal. When the capacitive load is driven, the liquid is discharged from a nozzle provided corresponding to the capacitive load. It is necessary to supply a sufficient current in order to operate such a capacitive load. Therefore, a capacitive load drive circuit that outputs the drive signal for driving the capacitive load is configured to include an amplification circuit that amplifies a source signal on which the drive signal is based by the amplification circuit.

JP-A-2010-124040 discloses a drive circuit (capacitive load drive circuit) that outputs a drive signal for driving a piezoelectric element, which is one of the capacitive loads, includes a class D amplification circuit as an amplification circuit, and reduces power consumption for outputting a drive signal COM.

However, from the viewpoint of further improving a discharge accuracy of a liquid in a liquid discharge apparatus, specifically, of further improving a waveform accuracy of a drive signal output by a capacitive load drive circuit, a technique described in JP-A-2010-124040 is not sufficient and there is room for improvement.

SUMMARY

According to an aspect of the present disclosure, there is provided a liquid discharge apparatus including a liquid discharge head that includes a capacitive load driven by being supplied with a drive signal and discharges a liquid by driving the capacitive load, and a capacitive load drive circuit that outputs the drive signal, in which the capacitive load drive circuit includes a modulation circuit that outputs a modulation signal obtained by modulating a base drive signal which is a base of the drive signal, an amplification circuit that outputs an amplified modulation signal obtained by amplifying the modulation signal to a first output point, a level shift circuit that outputs a level shift amplified modulation signal obtained by level-shifting a reference potential of the amplified modulation signal to a second output point, and a demodulation circuit that outputs the drive signal by demodulating the level shift amplified modulation signal, the amplification circuit includes a first gate drive circuit that outputs a first gate signal and a second gate signal based on the modulation signal, a first transistor that has one end supplied with a first voltage signal and the other end electrically coupled to the first output point, and operates based on the first gate signal, and a second transistor that has one end electrically coupled to the first output point and the other end supplied with a second voltage signal, and operates based on the second gate signal, the level shift circuit includes a bootstrap circuit that has a capacitor, receives input of a third voltage signal and the amplified modulation signal, and outputs a fourth voltage signal corresponding to the third voltage signal and the amplified modulation signal, a voltage detection circuit that detects a voltage value of the capacitor, a second gate drive circuit that outputs a third gate signal and a fourth gate signal based on the base drive signal, a third transistor that has one end supplied with the fourth voltage signal and the other end electrically coupled to the second output point, and operates based on the third gate signal, and a fourth transistor that has one end electrically coupled to the second output point and the other end supplied with the amplified modulation signal, and operates based on the fourth gate signal, the level shift circuit includes a first mode in which the level shift amplified modulation signal having the reference potential of the amplified modulation signal as a first potential is output by controlling the third transistor to be non-conductive and the fourth transistor to be conductive, and a second mode in which the level shift amplified modulation signal obtained by level-shifting the reference potential of the amplified modulation signal to a second potential higher than the first potential is output by controlling the third transistor to be conductive and the fourth transistor to be non-conductive, and in the level shift circuit, when transitioning from the first mode to the second mode, the second gate drive circuit executes a first control of outputting the third gate signal for controlling the third transistor to be conductive and the fourth gate signal for controlling the fourth transistor to be non-conductive from a state where the third gate signal for controlling the third transistor to be non-conductive and the fourth gate signal for controlling the fourth transistor to be conductive are output, and after the first control, the second gate drive circuit executes, one or a plurality of times according to the voltage value of the capacitor detected by the voltage detection circuit, a second control of outputting the third gate signal for controlling the third transistor to be non-conductive and the fourth gate signal for controlling the fourth transistor to be conductive, and then, outputting the third gate signal for controlling the third transistor to be conductive and the fourth gate signal for controlling the fourth transistor to be non-conductive.

According to another aspect of the present disclosure, there is provided a liquid discharge apparatus including a liquid discharge head that includes a capacitive load driven by being supplied with a drive signal and discharges a liquid by driving the capacitive load, and a capacitive load drive circuit that outputs the drive signal, in which the capacitive load drive circuit includes a modulation circuit that outputs a modulation signal obtained by modulating a base drive signal which is a base of the drive signal, an amplification circuit that outputs an amplified modulation signal obtained by amplifying the modulation signal to a first output point, a level shift circuit that outputs a level shift amplified modulation signal obtained by level-shifting a reference potential of the amplified modulation signal to a second output point, and a demodulation circuit that outputs the drive signal by demodulating the level shift amplified modulation signal, the amplification circuit includes a first gate drive circuit that outputs a first gate signal and a second gate signal based on the modulation signal, a first transistor that has one end supplied with a first voltage signal and the other end electrically coupled to the first output point, and operates based on the first gate signal, and a second transistor that has one end electrically coupled to the first output point and the other end supplied with a second voltage signal, and operates based on the second gate signal, the level shift circuit includes a bootstrap circuit that has a capacitor, receives input of a third voltage signal and the amplified modulation signal, and outputs a fourth voltage signal corresponding to the third voltage signal and the amplified modulation signal, a voltage detection circuit that detects a voltage value of the capacitor, a second gate drive circuit that outputs a third gate signal and a fourth gate signal based on the base drive signal, a third transistor that has one end supplied with the fourth voltage signal and the other end electrically coupled to the second output point, and operates based on the third gate signal, and a fourth transistor that has one end electrically coupled to the second output point and the other end supplied with the amplified modulation signal, and operates based on the fourth gate signal, the level shift circuit includes a first mode in which the level shift amplified modulation signal having the reference potential of the amplified modulation signal as a first potential is output by controlling the third transistor to be non-conductive and the fourth transistor to be conductive, and a second mode in which the level shift amplified modulation signal obtained by level-shifting the reference potential of the amplified modulation signal to a second potential higher than the first potential is output by controlling the third transistor to be conductive and the fourth transistor to be non-conductive, and in the level shift circuit, when transitioning from the second mode to the first mode, the second gate drive circuit executes a third control of outputting the third gate signal for controlling the third transistor to be non-conductive and the fourth gate signal for controlling the fourth transistor to be conductive from a state where the third gate signal for controlling the third transistor to be conductive and the fourth gate signal for controlling the fourth transistor to be non-conductive are output, and after the third control, the second gate drive circuit executes, one or a plurality of times according to the voltage value of the capacitor detected by the voltage detection circuit, a fourth control of outputting the third gate signal for controlling the third transistor to be conductive and the fourth gate signal for controlling the fourth transistor to be non-conductive, and then, outputting the third gate signal for controlling the third transistor to be non-conductive and the fourth gate signal for controlling the fourth transistor to be conductive.

According to still another aspect of the present disclosure, there is provided a capacitive load drive circuit that includes a capacitive load to be driven by being supplied with a drive signal and outputs the drive signal to a liquid discharge head which discharges a liquid by driving the capacitive load, the circuit including a modulation circuit that outputs a modulation signal obtained by modulating a base drive signal which is a base of the drive signal, an amplification circuit that outputs an amplified modulation signal obtained by amplifying the modulation signal to a first output point, a level shift circuit that outputs a level shift amplified modulation signal obtained by level-shifting a reference potential of the amplified modulation signal to a second output point, and a demodulation circuit that outputs the drive signal by demodulating the level shift amplified modulation signal, in which the amplification circuit includes a first gate drive circuit that outputs a first gate signal and a second gate signal based on the modulation signal, a first transistor that has one end supplied with a first voltage signal and the other end electrically coupled to the first output point, and operates based on the first gate signal, and a second transistor that has one end electrically coupled to the first output point and the other end supplied with a second voltage signal, and operates based on the second gate signal, the level shift circuit includes a bootstrap circuit that has a capacitor, receives input of a third voltage signal and the amplified modulation signal, and outputs a fourth voltage signal corresponding to the third voltage signal and the amplified modulation signal, a voltage detection circuit that detects a voltage value of the capacitor, a second gate drive circuit that outputs a third gate signal and a fourth gate signal based on the base drive signal, a third transistor that has one end supplied with the fourth voltage signal and the other end electrically coupled to the second output point, and operates based on the third gate signal, and a fourth transistor that has one end electrically coupled to the second output point and the other end supplied with the amplified modulation signal, and operates based on the fourth gate signal, the level shift circuit includes a first mode in which the level shift amplified modulation signal having the reference potential of the amplified modulation signal as a first potential is output by controlling the third transistor to be non-conductive and the fourth transistor to be conductive, and a second mode in which the level shift amplified modulation signal obtained by level-shifting the reference potential of the amplified modulation signal to a second potential higher than the first potential is output by controlling the third transistor to be conductive and the fourth transistor to be non-conductive, and in the level shift circuit, when transitioning from the first mode to the second mode, the second gate drive circuit executes a first control of outputting the third gate signal for controlling the third transistor to be conductive and the fourth gate signal for controlling the fourth transistor to be non-conductive from a state where the third gate signal for controlling the third transistor to be non-conductive and the fourth gate signal for controlling the fourth transistor to be conductive are output, and after the first control, the second gate drive circuit executes, one or a plurality of times according to the voltage value of the capacitor detected by the voltage detection circuit, a second control of outputting the third gate signal for controlling the third transistor to be non-conductive and the fourth gate signal for controlling the fourth transistor to be conductive, and then, outputting the third gate signal for controlling the third transistor to be conductive and the fourth gate signal for controlling the fourth transistor to be non-conductive.

According to still another aspect of the present disclosure, there is provided a capacitive load drive circuit that includes a capacitive load to be driven by being supplied with a drive signal and outputs the drive signal to a liquid discharge head which discharges a liquid by driving the capacitive load, the circuit including a modulation circuit that outputs a modulation signal obtained by modulating a base drive signal which is a base of the drive signal, an amplification circuit that outputs an amplified modulation signal obtained by amplifying the modulation signal to a first output point, a level shift circuit that outputs a level shift amplified modulation signal obtained by level-shifting a reference potential of the amplified modulation signal to a second output point, and a demodulation circuit that outputs the drive signal by demodulating the level shift amplified modulation signal, in which the amplification circuit includes a first gate drive circuit that outputs a first gate signal and a second gate signal based on the modulation signal, a first transistor that has one end supplied with a first voltage signal and the other end electrically coupled to the first output point, and operates based on the first gate signal, and a second transistor that has one end electrically coupled to the first output point and the other end supplied with a second voltage signal, and operates based on the second gate signal, the level shift circuit includes a bootstrap circuit that has a capacitor, receives input of a third voltage signal and the amplified modulation signal, and outputs a fourth voltage signal corresponding to the third voltage signal and the amplified modulation signal, a voltage detection circuit that detects a voltage value of the capacitor, a second gate drive circuit that outputs a third gate signal and a fourth gate signal based on the base drive signal, a third transistor that has one end supplied with the fourth voltage signal and the other end electrically coupled to the second output point, and operates based on the third gate signal, and a fourth transistor that has one end electrically coupled to the second output point and the other end supplied with the amplified modulation signal, and operates based on the fourth gate signal, the level shift circuit includes a first mode in which the level shift amplified modulation signal having the reference potential of the amplified modulation signal as a first potential is output by controlling the third transistor to be non-conductive and the fourth transistor to be conductive, and a second mode in which the level shift amplified modulation signal obtained by level-shifting the reference potential of the amplified modulation signal to a second potential higher than the first potential is output by controlling the third transistor to be conductive and the fourth transistor to be non-conductive, and in the level shift circuit, when transitioning from the second mode to the first mode, the second gate drive circuit executes a third control of outputting the third gate signal for controlling the third transistor to be non-conductive and the fourth gate signal for controlling the fourth transistor to be conductive from a state where the third gate signal for controlling the third transistor to be conductive and the fourth gate signal for controlling the fourth transistor to be non-conductive are output, and after the third control, the second gate drive circuit executes, one or a plurality of times according to the voltage value of the capacitor detected by the voltage detection circuit, a fourth control of outputting the third gate signal for controlling the third transistor to be conductive and the fourth gate signal for controlling the fourth transistor to be non-conductive, and then, outputting the third gate signal for controlling the third transistor to be non-conductive and the fourth gate signal for controlling the fourth transistor to be conductive.

DESCRIPTION OF EXEMPLARY EMBODIMENTS

Hereinafter, preferred embodiments of the present disclosure will be described with reference to the drawings. The drawings used are for convenience of description. The embodiments described below do not unreasonably limit the content of the present disclosure described in the aspects. In addition, not all of the configurations described below are essential constituent requirements of the present disclosure.

In the following description, an ink jet printer for a consumer is used as an example of a liquid discharge apparatus according to the present disclosure. However, the liquid discharge apparatus is not limited to an ink jet printer, and may be, for example, a coloring material discharge apparatus used for manufacturing a color filter such as a liquid crystal display, an electrode material discharge apparatus used for forming an electrode such as an organic EL display and a surface emission display, and a bioorganic substance discharge apparatus used for manufacturing a biochip.

1. Overview of Liquid Discharge Apparatus

Figure 1:
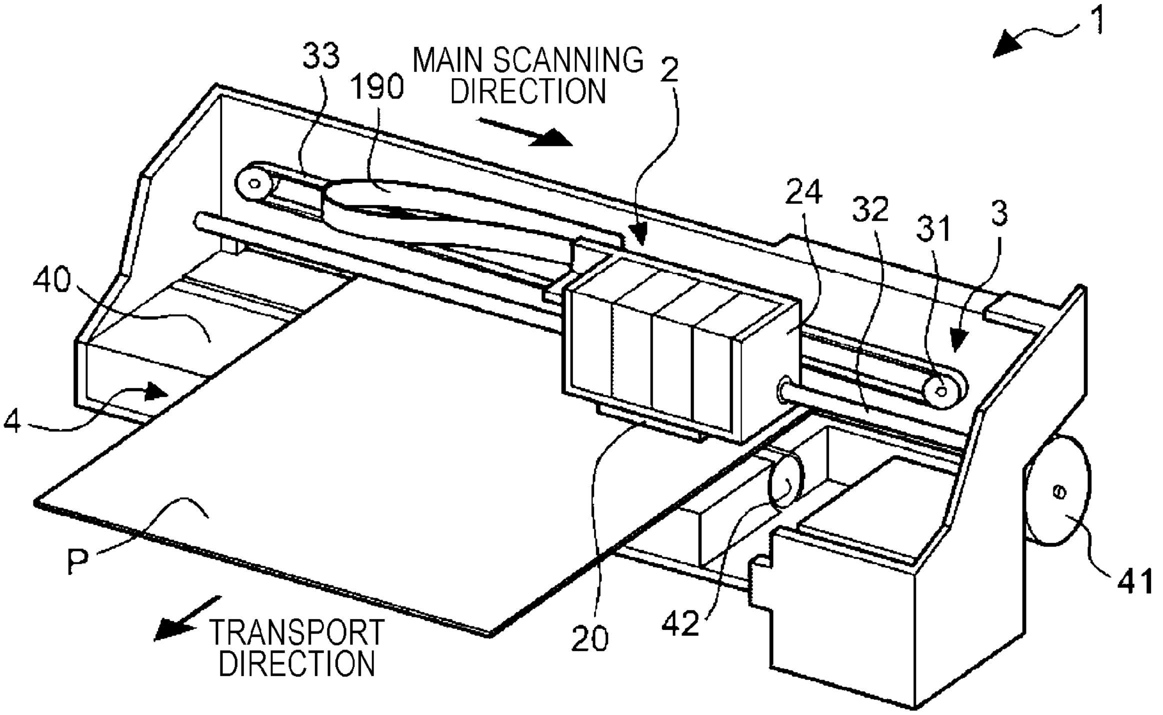
FIG. 1 is a view illustrating an example of a structure of a liquid discharge apparatus.

FIG. 1 is a view illustrating an example of a structure of a liquid discharge apparatus 1. As illustrated in FIG. 1, the liquid discharge apparatus 1 is provided with a moving object 2 and a moving unit 3 that reciprocates the moving object 2 along the main scanning direction.

The moving unit 3 includes a carriage motor 31 that serves as a drive source for reciprocating movement of the moving object 2 along the main scanning direction, a carriage guide shaft 32 that has both ends fixed, and a timing belt 33 that extends substantially parallel to the carriage guide shaft 32 and is driven by the carriage motor 31.

The moving object 2 includes a carriage 24. The carriage 24 is supported by the carriage guide shaft 32 so as to be able to reciprocate and is fixed to a portion of the timing belt 33. The timing belt 33 travels forward and rearward by the carriage motor 31, so that the moving object 2 having the carriage 24 is guided by the carriage guide shaft 32 to reciprocate. In addition, a head unit 20 is located in a portion of the moving object 2 facing a medium P. That is, the head unit 20 is mounted on the carriage 24. Multiple nozzles that discharge an ink as a liquid are located on a surface of the head unit 20 facing the medium P. In addition, various control signals for controlling the operation of the head unit 20 are supplied to the head unit 20 via a cable 190. As such a cable 190, a flexible flat cable or the like that can slide following the reciprocating movement of the moving object 2 can be used.

In addition, the liquid discharge apparatus 1 is provided with a transport unit 4 for transporting the medium P on a platen 40 along a transport direction. The transport unit 4 includes a transport motor 41 that is a drive source for transporting the medium P, and a transport roller 42 that transports the medium P along the transport direction by being rotated with the drive force of the transport motor 41.

In the liquid discharge apparatus 1 configured as described above, the head unit 20 discharges the ink on the medium P in synchronization with the timing when the medium P is transported by the transport unit 4. As a result, the ink discharged by the head unit 20 lands at a desired position on the medium P, and a desired image or character is formed on the surface of the medium P.

Figure 2:
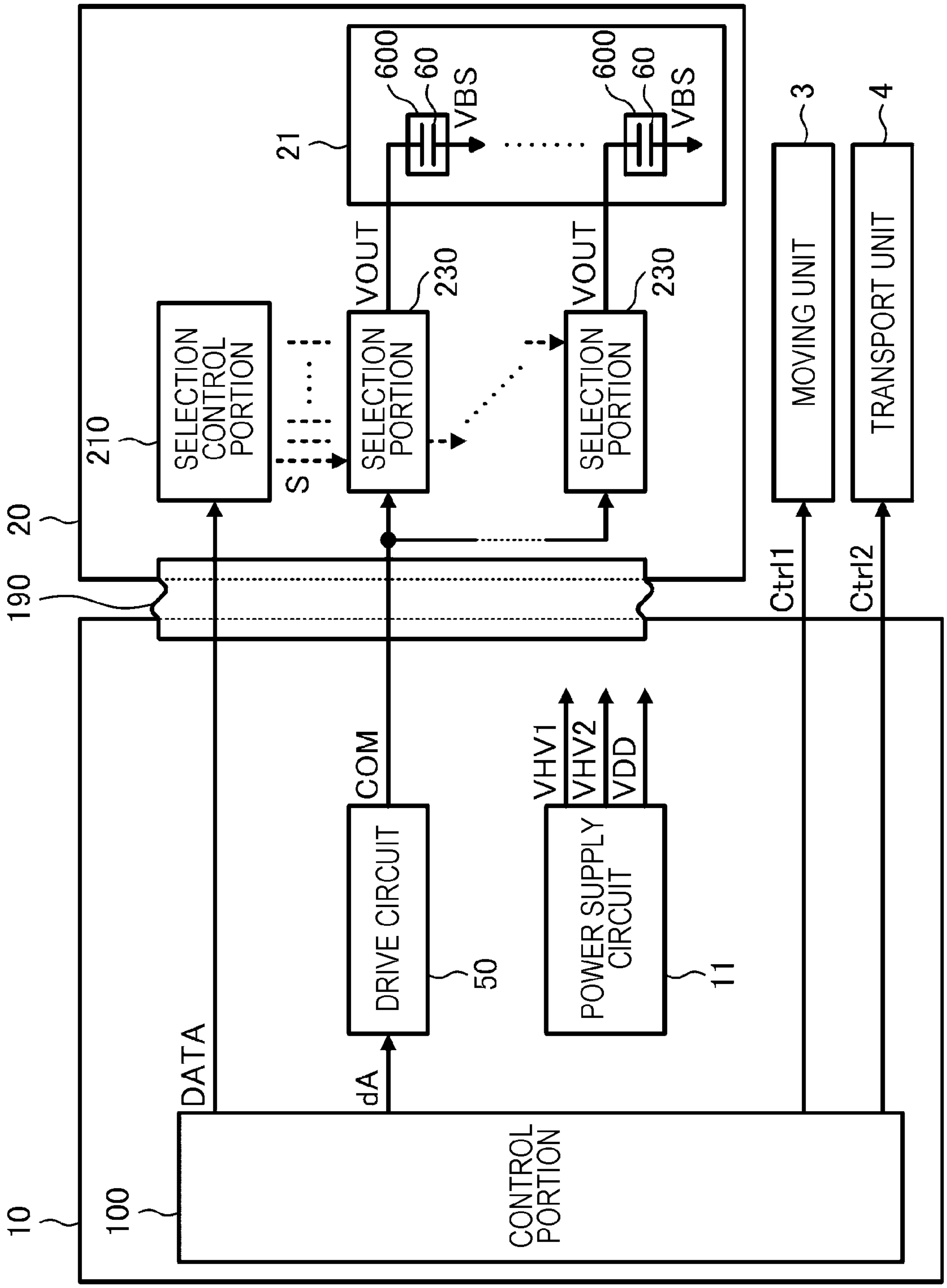
FIG. 2 is a diagram illustrating a functional configuration of the liquid discharge apparatus.

Next, a functional configuration of the liquid discharge apparatus 1 will be described. FIG. 2 is a diagram illustrating the functional configuration of the liquid discharge apparatus 1. As illustrated in FIG. 2, the liquid discharge apparatus 1 is provided with a control unit 10, a head unit 20, a moving unit 3, a transport unit 4, and a cable 190. The cable 190 electrically couples the control unit 10 and the head unit 20.

The control unit 10 includes a power supply circuit 11, a control portion 100, and a drive circuit 50.

The power supply circuit 11 generates voltage signals VHV1, VHV2, and VDD having a predetermined voltage value from a commercial AC power supply supplied from the outside of the liquid discharge apparatus 1, and outputs the voltage signals to the various components of the liquid discharge apparatus 1. Here, the voltage signals VHV1 and VHV2 output by the power supply circuit 11 are, for example, a DC voltage of 25 V, and the voltage signal VDD is, for example, a DC voltage of 3.3 V. Such a power supply circuit 11 may include, for example, an AC/DC converter that generates a DC voltage having a predetermined voltage value from a commercial AC power supply, and a DC/DC converter that converts the voltage value of the generated DC voltage to generate voltage signals VHV1, VHV2, and VDD. The power supply circuit 11 may output DC voltages having different voltage values in addition to the voltage signals VHV1, VHV2, and VDD. Here, in the following description, the voltage value of the voltage signal VHV1 may be referred to as a voltage vhv1, the voltage value of the voltage signal VHV2 may be referred to as a voltage vhv2, and the voltage value of the voltage signal VDD may be referred to as a voltage vdd.

An image data is supplied to the control portion 100 from an external device (not illustrated) provided outside the liquid discharge apparatus 1, for example, from a host computer or the like. The control portion 100 generates various control signals for controlling each part of the liquid discharge apparatus 1 by performing various image processing and the like on the supplied image data, and outputs the various control signals to the corresponding configurations.

Specifically, the control portion 100 generates a control signal Ctrl1 for controlling the reciprocating movement of the moving object 2 based on the image data and outputs the control signal Ctrl1 to the carriage motor 31 included in the moving unit 3. In addition, the control portion 100 generates a control signal Ctrl2 for controlling the transport of the medium P based on the image data, and outputs the control signal Ctrl2 to the transport motor 41 included in the transport unit 4. As a result, the reciprocating movement of the moving object 2 along the main scanning direction and the transport of the medium P along the transport direction are controlled by the control portion 100. That is, the head unit 20 can discharge the ink on the medium P at a predetermined timing synchronized with the transport of the medium P. As a result, the ink can be landed at a desired position on the medium P, and a desired image or character can be formed on the medium P.

The control portion 100 may convert the control signal Ctrl1 for controlling the reciprocating movement of the moving object 2 into a signal by a carriage motor driver (not illustrated) and then supply the control signal Ctrl1 to the moving unit 3. Similarly, the control portion 100 may convert the control signal Ctrl2 for controlling the transport of the medium P by a transport motor driver (not illustrated) and then supply the control signal Ctrl2 to the transport unit 4.

In addition, the control portion 100 outputs a base drive signal dA to the drive circuit 50. The base drive signal dA output by the control portion 100 is a signal including information defining a signal waveform of the drive signal COM supplied to the head unit 20, and is, for example, a digital signal. The drive circuit 50 converts the input digital base drive signal dA into an analog signal, and then amplifies the converted signal to generate a drive signal COM. The drive circuit 50 supplies the generated drive signal COM to the head unit 20. The details of the configuration and operation of the drive circuit 50 will be described later.

In addition, the control portion 100 generates a drive data signal DATA for controlling the operation of the head unit 20 and outputs the drive data signal DATA to the head unit 20. The head unit 20 includes a selection control portion 210, a plurality of selection portions 230, and a liquid discharge head 21. In addition, the liquid discharge head 21 includes a plurality of discharge portions 600 including a piezoelectric element 60. Each of the plurality of selection portions 230 is provided corresponding to the piezoelectric element 60 included in each of a plurality of discharge portions 600 included in the liquid discharge head 21.

The drive data signal DATA is input to the selection control portion 210. The selection control portion 210 generates a selection signal S instructing each of the selection portions 230 whether to select or not select the drive signal COM based on the input drive data signal DATA, and outputs the selection signal S to each of the plurality of selection portions 230. The drive signal COM and the corresponding selection signal S are input to each of the plurality of selection portions 230. Each of the plurality of selection portions 230 selects or does not select the drive signal COM based on the input selection signal S to generate and output the drive signal VOUT. That is, each of the plurality of selection portions 230 generates a drive signal VOUT based on the drive signal COM and supplies the drive signal VOUT to one end of the piezoelectric element 60 included in the corresponding discharge portion 600 included in the liquid discharge head 21.

In addition, a reference voltage signal VBS is commonly supplied to the other end of the piezoelectric element 60 included in the plurality of discharge portions 600. The reference voltage signal VBS is a signal that functions as a reference potential for driving the piezoelectric element 60 driven by the drive signal VOUT, and is, for example, a signal having a constant potential such as 5.5 V, 6 V, or a ground potential.

The piezoelectric element 60 is provided corresponding to each of the plurality of nozzles in the head unit 20. The piezoelectric element 60 is driven according to the potential difference between the drive signal VOUT supplied to one end and the reference voltage signal VBS supplied to the other end. As a result, an amount of ink corresponding to the driving amount of the piezoelectric element 60 is discharged from the discharge portion 600 including the piezoelectric element 60.

Although FIG. 2 illustrates when the head unit 20 has one liquid discharge head 21, the number of liquid discharge heads 21 included in the head unit 20 is not limited to one, and the head unit 20 may have a plurality of liquid discharge heads 21 according to the type and number of inks to be discharged.

As described above, the liquid discharge apparatus 1 in the present embodiment is provided with a plurality of piezoelectric elements 60 that are driven by being supplied with the drive signals COM and VOUT, the liquid discharge head 21 that discharges ink as an example of liquid by driving the plurality of piezoelectric elements 60, and the drive circuit 50 that outputs the drive signal COM.

2. Configuration of Discharge Portion

Figure 3:
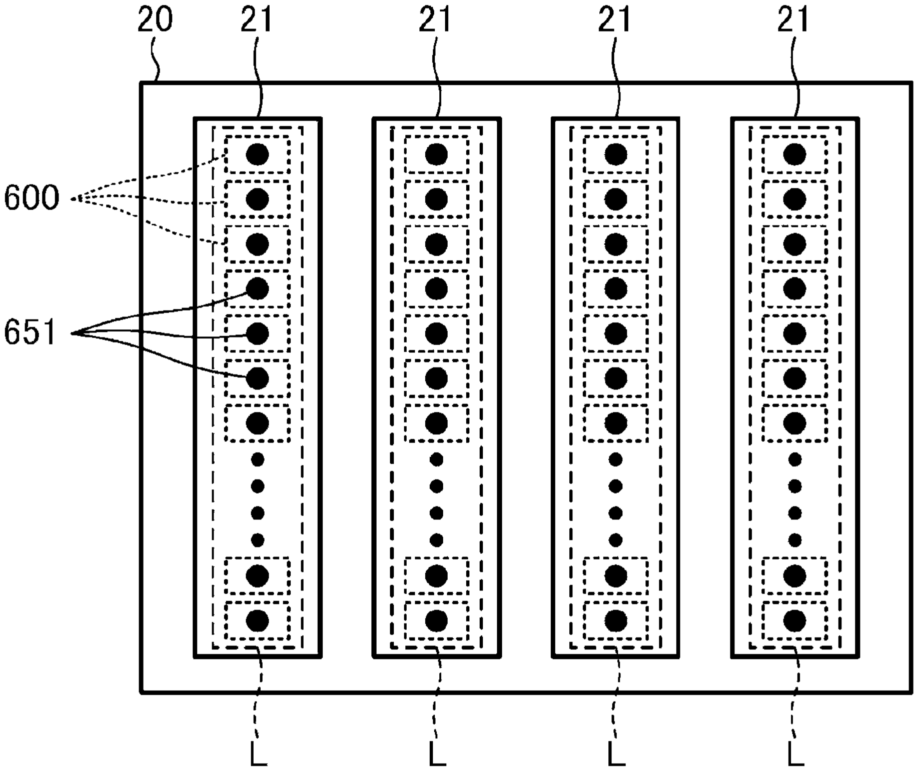
FIG. 3 is a diagram illustrating an example of arrangement of a plurality of discharge portions in a head unit.

Next, a configuration of the plurality of discharge portions 600 included in the liquid discharge head 21 and an example of arrangement of the plurality of discharge portions 600 in the head unit 20 will be described. FIG. 3 is a diagram illustrating an example of arrangement of the plurality of discharge portions 600 in the head unit 20. FIG. 3 illustrates when the head unit 20 includes four liquid discharge heads 21.

As illustrated in FIG. 3, each of the four liquid discharge heads 21 includes the plurality of discharge portions 600 provided in a row in one direction. That is, the liquid discharge head 21 includes a nozzle row L in which nozzles 651, which will be described later, included in the discharge portion 600 are arranged in one direction. In addition, the liquid discharge heads 21 are located side by side in the head unit 20 in a direction intersecting the nozzle row L. That is, the head unit 20 is formed with the same number of nozzle rows L as the number of liquid discharge heads 21. The arrangement of the nozzles 651 in the nozzle row L included in the liquid discharge head 21 is not limited to one row, and for example, even-numbered nozzles 651 counted from one end portion of the plurality of nozzles 651 and odd-numbered nozzles 651 counted from one end portion of the plurality of nozzles 651 may be arranged in a staggered manner so that the positions of the nozzles 651 are different. In the liquid discharge head 21, one nozzle row L may be formed by arranging the plurality of nozzles 651 in two or more rows.

Figure 4:
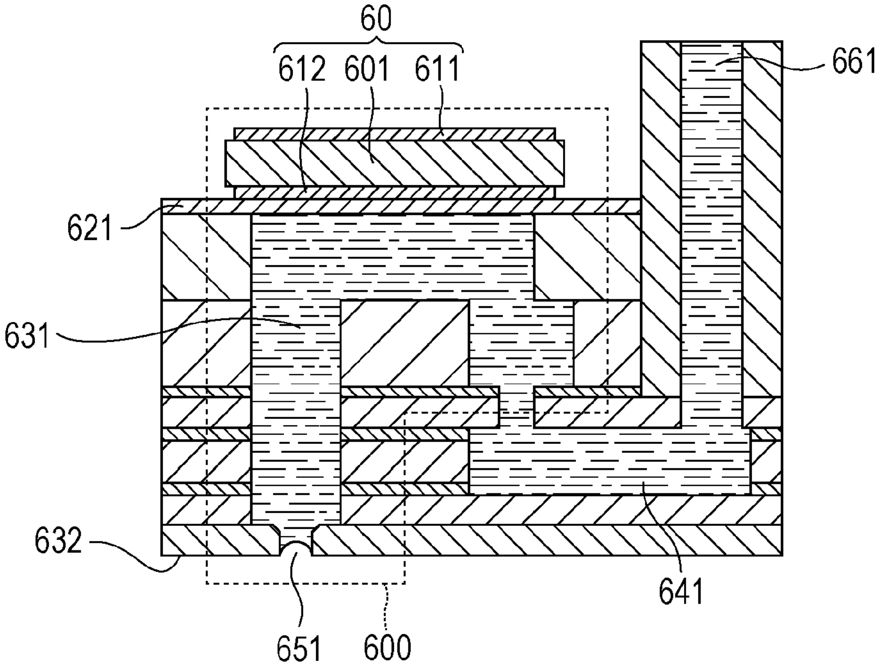
FIG. 4 is a diagram illustrating an example of a configuration of a discharge portion.

Next, an example of a configuration of the discharge portion 600 will be described. FIG. 4 is a diagram illustrating an example of the configuration of the discharge portion 600. As illustrated in FIG. 4, the discharge portion 600 includes a piezoelectric element 60, a diaphragm 621, a cavity 631, and a nozzle 651. The diaphragm 621 is displaced as the piezoelectric element 60 provided on the upper surface in FIG. 4 is driven. That is, the diaphragm 621 functions as a diaphragm that expands/contracts the internal volume of the cavity 631. The inside of the cavity 631 is filled with ink. The cavity 631 functions as a pressure chamber in which internal volume changes due to displacement of the diaphragm 621 generated by driving the piezoelectric element 60. The nozzle 651 is an opening portion formed in the nozzle plate 632 and communicating with the cavity 631. As the internal volume of the cavity 631 changes, the ink stored inside the cavity 631 is discharged from the nozzle 651.

The piezoelectric element 60 has a structure in which a piezoelectric body 601 is interposed between a pair of electrodes 611 and 612. In the piezoelectric body 601 having this structure, the electrodes 611 and 612 and the central portion of the diaphragm 621 are bent in the vertical direction in FIG. 4 with respect to both end portions according to a potential difference between the electrodes 611 and 612.

Specifically, the drive signal VOUT is supplied to the electrode 611, which is one end of the piezoelectric element 60, and the reference voltage signal VBS is supplied to the electrode 612, which is the other end. When the piezoelectric element 60 is driven upward in response to a change in the voltage value of the drive signal VOUT, the diaphragm 621 is displaced upward. As a result, the internal volume of the cavity 631 is increased. Therefore, the ink stored in a reservoir 641 is drawn into the cavity 631. On the other hand, when the piezoelectric element 60 is driven downward in response to a change in the voltage value of the drive signal VOUT, the diaphragm 621 is displaced downward. As a result, the internal volume of the cavity 631 is reduced. Therefore, an amount of ink corresponding to the degree of reduction in the internal volume of the cavity 631 is discharged from the nozzle 651.

As described above, the liquid discharge head 21 includes the piezoelectric element 60, and discharges ink on the medium P by driving the piezoelectric element 60. The discharge portion 600 and the piezoelectric element 60 included in the discharge portion 600 are not limited to the illustrated configuration, and may have a structure in which the piezoelectric element 60 is driven based on the drive signal VOUT and ink can be discharged from the corresponding nozzle 651 by driving the piezoelectric element 60.

3. Configuration and Operation of Drive Circuit

As described above, the piezoelectric element 60 included in the discharge portion 600 provided in the liquid discharge head 21 is driven by the drive signal VOUT based on the drive signal COM output by the drive circuit 50. When the piezoelectric element 60 is driven, ink is discharged from the discharge portion 600 including the piezoelectric element 60. Next, the configuration and operation of the drive circuit 50 that outputs the drive signal COM which is a base of the drive signal VOUT driving the piezoelectric element 60 will be described.

3.1 Signal Waveform of Drive Signal COM

Figure 5:
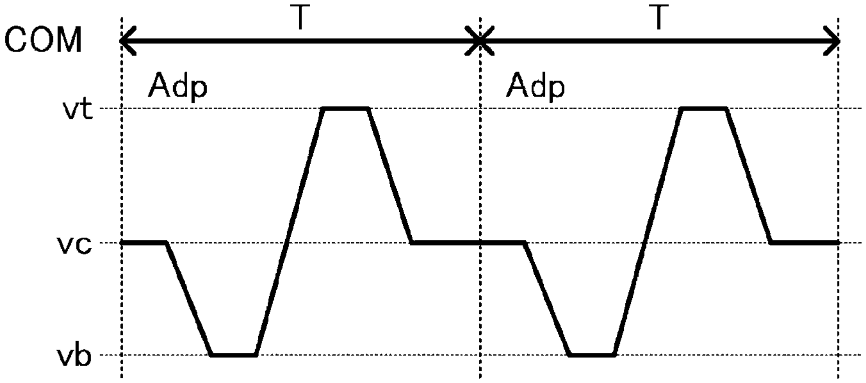
FIG. 5 is a graph illustrating an example of a signal waveform of a drive signal.

In describing the configuration and operation of the drive circuit 50, first, an example of a signal waveform of the drive signal COM output by the drive circuit 50 will be described. FIG. 5 is a graph illustrating an example of the signal waveform of the drive signal COM. As illustrated in FIG. 5, the drive signal COM includes a trapezoidal waveform Adp for each cycle T. The trapezoidal waveform Adp includes a constant period at voltage vc, a constant period at voltage vb, which has a lower voltage value than voltage vc, following the constant period at voltage vc, a constant period at voltage vt, which has a higher voltage value than voltage vc, following the constant period at voltage vb, and a constant period at voltage vc, following a constant period at voltage vt. That is, the drive signal COM includes the trapezoidal waveform Adp in which the voltage value changes between the voltage v and the voltage vb and starts at the voltage vc and ends at the voltage vc in the cycle T.

The voltage vc corresponds to a potential that is a reference for the displacement of the piezoelectric element 60. The voltage value of the drive signal COM supplied to the piezoelectric element 60 changes from the voltage vc to the voltage vb, so that the piezoelectric element 60 is driven upward as illustrated in FIG. 4. As a result, the diaphragm 621 is displaced upward as illustrated in FIG. 4. When the diaphragm 621 is displaced upward as illustrated in FIG. 4, the internal volume of the cavity 631 expands, and ink is drawn from the reservoir 641 into the cavity 631. Thereafter, the voltage value of the drive signal COM supplied to the piezoelectric element 60 changes from the voltage vb to the voltage vt, so that the piezoelectric element 60 is driven downward as illustrated in FIG. 4. As a result, the diaphragm 621 is displaced downward as illustrated in FIG. 4. When the diaphragm 621 is displaced downward as illustrated in FIG. 4, the internal volume of the cavity 631 is reduced, and the ink stored in the cavity 631 is discharged from the nozzle 651.

In addition, for a certain period of time after the ink is discharged from the nozzle 651 by driving the piezoelectric element 60, the ink in the vicinity of the nozzle 651 or the diaphragm 621 may continue to vibrate. The certain period at the voltage vc included in the drive signal COM also functions as a period for stopping the vibration not contributing to the discharge of such an ink or the ink generated in the diaphragm 621.

Here, the signal waveform of the drive signal COM illustrated in FIG. 5 is an example, is not limited thereto, and may include various shapes of signal waveforms according to the physical properties of the ink discharged by the liquid discharge head 21, the length of the cycle T of the drive signal COM, the transport speed of the medium P, and the like.

3.2 Configuration and Operation of Drive Signal Output Circuit

Figure 6A:
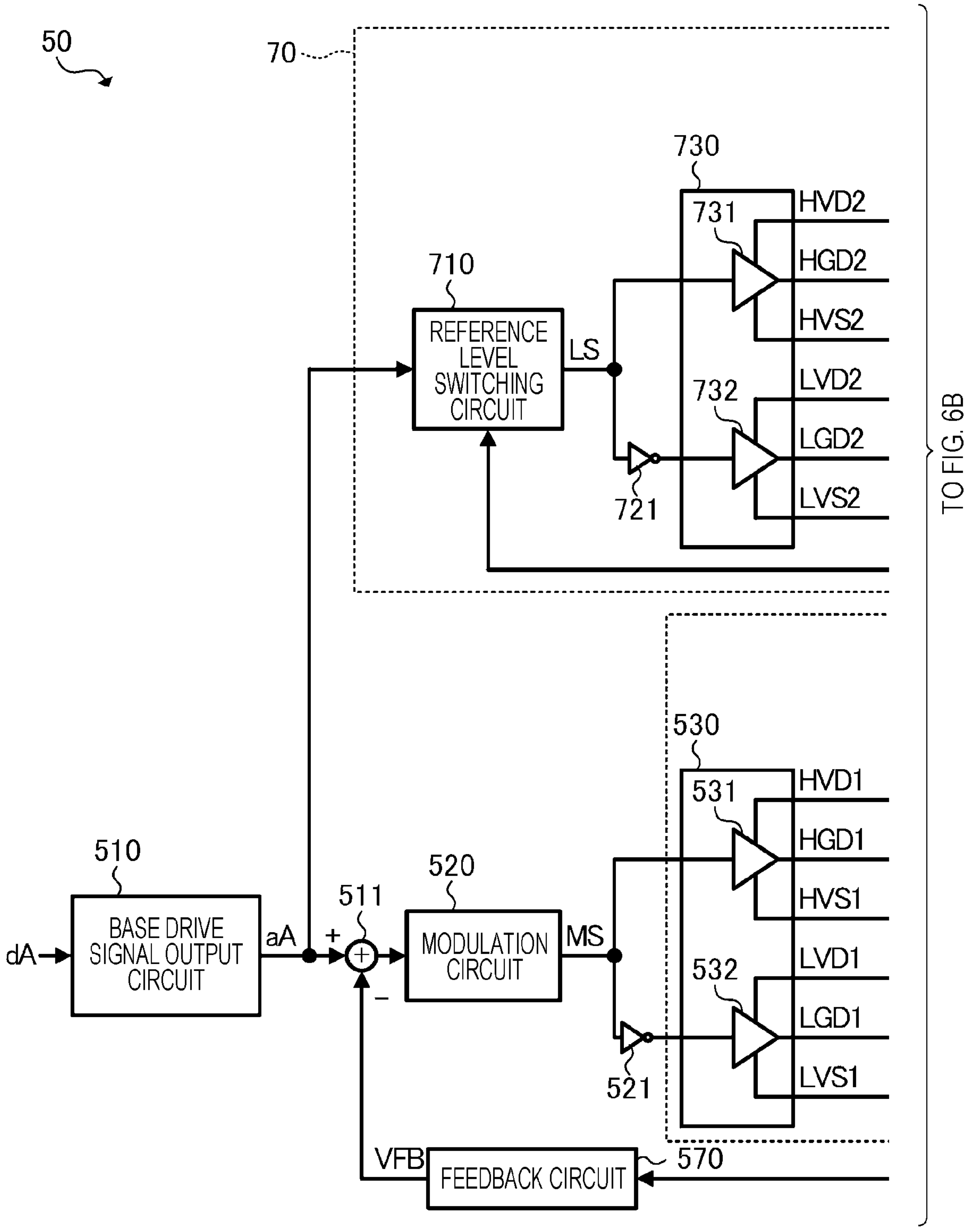
FIGS. 6A and 6B are diagrams illustrating an example of a functional configuration of a drive circuit.
Figure 6B:
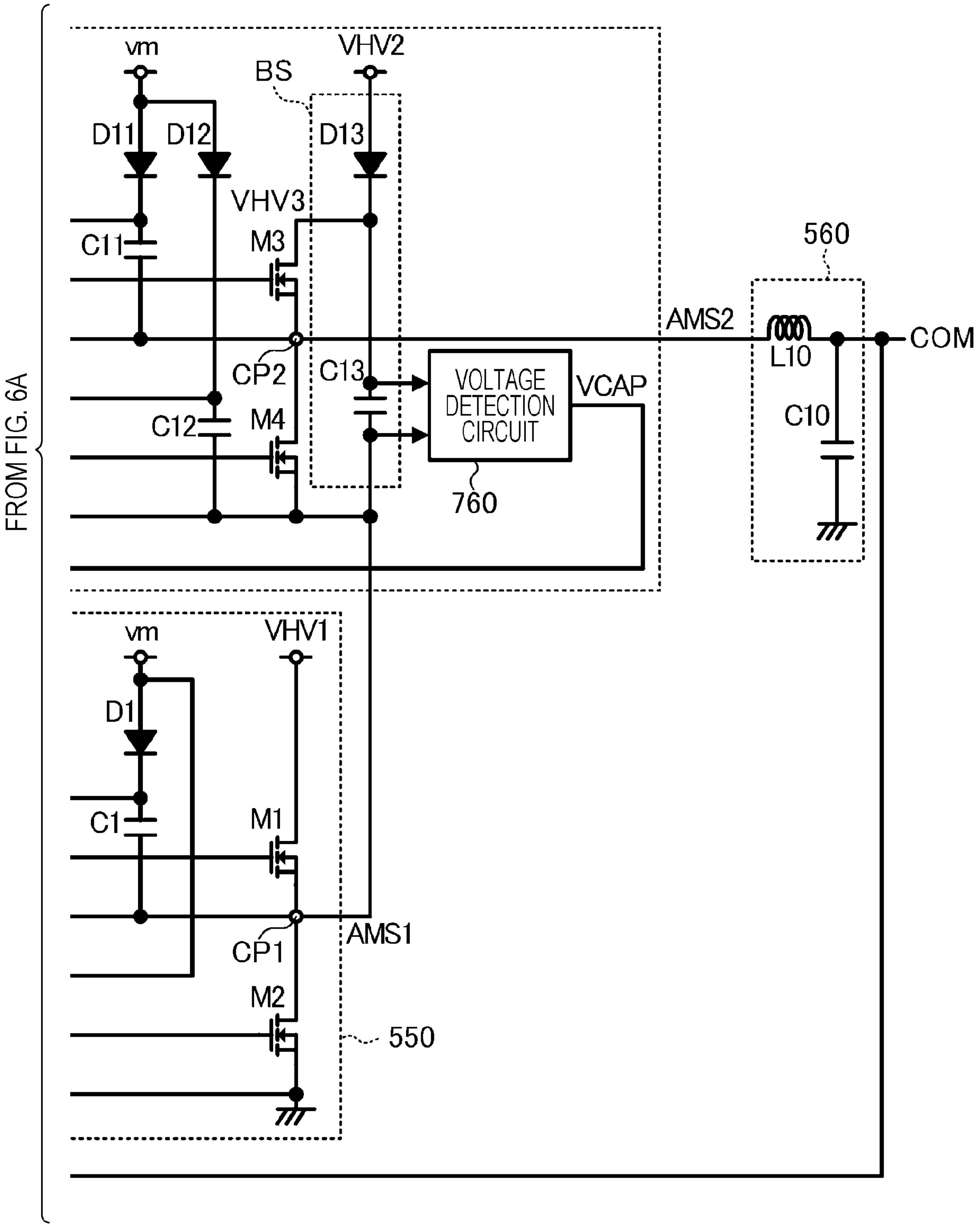

Next, the configuration and operation of the drive circuit 50 that generates and outputs the drive signal COM will be described. FIGS. 6A and 6B are diagrams illustrating an example of the functional configuration of the drive circuit 50. As illustrated in FIGS. 6A and 6B, the drive circuit 50 includes a base drive signal output circuit 510, an adder 511, a modulation circuit 520, an inverter 521, an amplification circuit 550, a demodulation circuit 560, a feedback circuit 570, and a level shift circuit 70.

The base drive signal dA, which is a digital signal, is input from the control portion 100 to the base drive signal output circuit 510. The base drive signal output circuit 510 performs digital-to-analog conversion of the input base drive signal dA, and then outputs the converted analog signal as a base drive signal aA. That is, the base drive signal output circuit 510 includes a digital to analog (D/A) converter. The voltage amplitude of the base drive signal aA is, for example, 1 to 2 V, and the drive circuit 50 outputs a signal obtained by amplifying the base drive signal aA as a drive signal COM. That is, the base drive signal aA corresponds to a target signal before amplification of the drive signal COM.

The base drive signal aA is input to an input terminal of the adder 511 on the + side. A feedback signal VFB obtained by feeding back the drive signal COM via a feedback circuit 570, which will be described later, is input to an input terminal of the adder 511 on the − side. The adder 511 outputs a signal obtained by subtracting the feedback signal VFB input to the input terminal on the − side from the base drive signal aA input to the input terminal on the + side to the modulation circuit 520.

The modulation circuit 520 pulse-modulates the signal output by the adder 511 to generate a modulation signal MS. The modulation circuit 520 outputs the generated modulation signal MS to the amplification circuit 550. Such a modulation circuit 520 generates a pulse density modulation signal (PDM signal) obtained by modulating the signal output by the adder 511 by a pulse density modulation (PDM) method, and outputs the PDM signal as a modulation signal MS to the amplification circuit 550. That is, the modulation circuit 520 outputs the modulation signal MS obtained by modulating the base drive signal aA corresponding to the base drive signal dA, which is a base of the drive signal COM. Specifically, the modulation circuit 520 compares the voltage value of the base drive signal aA with the voltage vref which is a predetermined reference voltage. The modulation circuit 520 generates and outputs the modulation signal MS that is H level when the voltage value of the input base drive signal aA is higher than the voltage vref, and is L level when the voltage value of the input base drive signal aA is lower than the voltage vref.

The amplification circuit 550 includes a gate drive circuit 530, a diode Dl, a capacitor C1, and transistors M1 and M2. The amplification circuit 550 generates an amplified modulation signal AMS1 obtained by amplifying the modulation signal MS and outputs the amplified modulation signal AMS1 from a midpoint CP1.

Specifically, the modulation signal MS is input to the gate driver 531 included in the gate drive circuit 530. The gate driver 531 generates and outputs a gate signal HGD1 obtained by level-shifting the input modulation signal MS. In addition, the modulation signal MS is input to the gate driver 532 included in the gate drive circuit 530 after the logic level is inverted in the inverter 521. The gate driver 532 generates and outputs a gate signal LGD1 obtained by level-shifting a signal in which the logic level of the input modulation signal MS is inverted.

The transistors M1 and M2 are both configured to include N-channel MOS-FETs. The gate signal HGD1 output by the gate driver 531 is input to a gate terminal of the transistor M1. The voltage signal VHV1 is supplied to a drain terminal of the transistor M1. A source terminal of the transistor M1 is electrically coupled to the midpoint CP1. In addition, the gate signal LGD1 output by the gate driver 532 is input to a gate terminal of the transistor M2. The drain terminal of the transistor M2 is electrically coupled to the midpoint CP1. A ground potential is supplied to the source terminal of the transistor M2. The transistor M1 operates based on the gate signal HGD1 and the transistor M2 operates based on the gate signal LGD1. Therefore, an amplified modulation signal AMS1 obtained by amplifying the modulation signal MS with a voltage vhv1, which is the voltage value of the voltage signal VHV1, is generated at a midpoint CP1 where the transistor M1 and the transistor M2 are coupled.

Here, the operation of the gate drive circuit 530 that outputs the gate signal HGD1 and the gate signal LGD1 based on the modulation signal MS will be described. The gate drive circuit 530 includes gate drivers 531, and 532. As described above, the modulation signal MS is input to the gate driver 531 and a signal in which the logic level of the modulation signal MS is inverted by the inverter 521 is input to the gate driver 532. That is, the signal input to the gate driver 531 and the signal input to the gate driver 532 are exclusively at the H level. Here, being H level exclusively includes the fact that the H level signals are not simultaneously input to the gate driver 531 and the gate driver 532. That is, the case where the L level signals are simultaneously input to the gate driver 531 and the gate driver 532 is not excluded.

A power supply terminal of the gate driver 531 on the low potential side is electrically coupled to the midpoint CP1. Therefore, the signal generated at the midpoint CP1 is supplied as a voltage signal HVS1 to the power supply terminal of the gate driver 531 on the low potential side. In addition, the power supply terminal of the gate driver 531 on the high potential side is electrically coupled to the cathode terminal of the diode Dl and one end of the capacitor C1. A voltage vm is supplied to the anode terminal of the diode Dl, and the other end of the capacitor C1 is electrically coupled to the midpoint CP1. That is, the diode Dl and the capacitor C1 form a bootstrap circuit, and the output voltage of the bootstrap circuit is supplied to the power supply terminal of the gate driver 531 on the high potential side. Therefore, a voltage signal HVD1 having a voltage value higher than the voltage signal HVS1 by a voltage vm input to the power supply terminal of the gate driver 531 on the low potential side is supplied to the power supply terminal of the gate driver 531 on the high potential side.

Therefore, when the H level modulation signal MS is input to the gate driver 531, the gate driver 531 outputs the gate signal HGD1 having a voltage value based on the voltage signal HVD1 which is higher than the voltage value of the midpoint CP1 by a voltage vm. When the L level modulation signal MS is input to the gate driver 531, the gate driver 531 outputs the gate signal HGD1 having a voltage value based on the voltage signal HVS1 which is the voltage value of the midpoint CP1.

Here, the voltage vm is a voltage value capable of driving each of the transistors M1 and M2 and the transistors M3 and M4 described later, and is, for example, a DC voltage of 7.5 V. Such a voltage vm is generated, for example, by stepping down or boosting the voltage signals VHV1, VHV2, and VDD output by the power supply circuit 11.

A ground potential signal is supplied to the power supply terminal of the gate driver 532 on the low potential side as a voltage signal LVS1. In addition, the voltage vm is supplied to the power supply terminal of the gate driver 532 on the high potential side as a voltage signal LVD1. Therefore, when an H level signal in which the logic level of the L level modulation signal MS is inverted by the inverter 521 is input to the gate driver 532, the gate driver 532 outputs the gate signal LGD1 having a voltage value based on the voltage signal LVD1 having a voltage vm. When an L level signal in which the logic level of the H level modulation signal MS is inverted by the inverter 521 is input to the gate driver 532, the gate driver 532 outputs the gate signal LGD1 having a voltage value based on the ground potential voltage signal LVS1.

As described above, the amplification circuit 550 includes the gate drive circuit 530 that outputs the gate signal HGD1 and the gate signal LGD1 based on the modulation signal MS, the transistor M1 in which the voltage signal VHV1 is supplied to the drain terminal, which is one end, the source terminal, which is the other end, is electrically coupled to the midpoint CP1, and operates based on the gate signal HGD1 input to the gate terminal, and the transistor M2 in which the drain terminal, which is one end, is electrically coupled to the midpoint CP1, the ground potential is supplied to the source terminal, which is the other end, and which operates based on the gate signal LGD1 input to the gate terminal.

The level shift circuit 70 includes a reference level switching circuit 710, a gate drive circuit 730, diodes D11 and D12, capacitors C11 and C12, transistors M3 and M4, a bootstrap circuit BS, and a voltage detection circuit 760. The level shift circuit 70 outputs a level shift amplified modulation signal AMS2 obtained by level-shifting the reference potential of the amplified modulation signal AMS1 to a midpoint CP2.

Specifically, the base drive signal aA is input to the reference level switching circuit 710 included in the level shift circuit 70. The reference level switching circuit 710 generates a reference level switching signal LS based on the base drive signal aA and outputs the reference level switching signal LS to the gate drive circuit 730. Specifically, the reference level switching circuit 710 generates an H level reference level switching signal LS when the voltage value defined by the base drive signal aA is equal to or higher than a predetermined threshold voltage, and outputs the reference level switching signal LS to the gate drive circuit 730. The reference level switching circuit 710 generates an L level reference level switching signal LS when the voltage value defined by the base drive signal aA is less than the threshold voltage and outputs the reference level switching signal LS to the gate drive circuit 730. Here, the predetermined threshold voltage is equal to or less than the voltage vhv1 which is a voltage value of the voltage signal VHV1 supplied to the amplification circuit 550, and is preferably a voltage value in the vicinity of the voltage vhv1.

The gate drive circuit 730 outputs the gate signal HGD2 for driving the transistor M3 and the gate signal LGD2 for driving the transistor M4 according to the logic level of the reference level switching signal LS.

Specifically, the reference level switching signal LS output by the reference level switching circuit 710 is input to the gate driver 731 included in the gate drive circuit 730. The gate driver 731 generates and outputs a gate signal HGD2 obtained by level-shifting the input reference level switching signal LS. In addition, the reference level switching signal LS output by the reference level switching circuit 710 is input to the gate driver 732 of the gate drive circuit 730 after the logic level is inverted in the inverter 721. The gate driver 732 generates and outputs a gate signal LGD2 obtained by level-shifting a signal in which the logic level of the input reference level switching signal LS is inverted.

The transistors M3 and M4 are both configured to include N-channel MOS-FETs. The gate signal HGD2 output by the gate driver 731 is input to the gate terminal of the transistor M3. The voltage signal VHV3 output by the bootstrap circuit BS is supplied to the drain terminal of the transistor M3. The source terminal of the transistor M3 is electrically coupled to the midpoint CP2. In addition, the gate signal LGD2 output by the gate driver 732 is input to the gate terminal of the transistor M4. The drain terminal of the transistor M4 is electrically coupled to the midpoint CP2. The source terminal of the transistor M4 is electrically coupled to the midpoint CP1. The transistor M3 operates based on the gate signal HGD2, and the transistor M4 operates based on the gate signal LGD2, so that a level shift amplified modulation signal AMS2 obtained by level-shifting the reference potential of the amplified modulation signal AMS1 is generated at the midpoint CP2 where the transistor M3 and the transistor M4 are coupled.

That is, the transistor M3 included in the level shift circuit 70 is supplied with the voltage signal VHV3 output by the bootstrap circuit BS to the drain terminal, which is one end, has the source terminal, which is the other end, electrically coupled to the midpoint CP2, and operates based on the gate signal HGD2 output by the gate driver 731. The transistor M4 included in the level shift circuit 70 has the drain terminal, which is one end, electrically coupled to the midpoint CP2, is supplied with the amplified modulation signal AMS1 to the source terminal, which is the other end, and operates based on the gate signal LGD2 output by the gate driver 732. The level shift circuit 70 outputs the generated signal to the midpoint CP2 to which the transistor M3 and the transistor M4 are coupled as the level shift amplified modulation signal AMS2.

The bootstrap circuit BS includes a diode D13 and a capacitor C13. A voltage signal VHV2 is supplied to the anode terminal of the diode D13, and the cathode terminal of the diode D13 is electrically coupled to one end of the capacitor C13. In addition, the other end of the capacitor C13 is electrically coupled to the midpoint CP1. That is, the bootstrap circuit BS includes the capacitor C13, and the voltage signal VHV2 and the amplified modulation signal AMS1 output to the midpoint CP1 are input to the bootstrap circuit BS. The bootstrap circuit BS generates a voltage signal VHV3 obtained by adding the voltage value of the amplified modulation signal AMS1 to the voltage value based on the voltage vhv2 which is the voltage value of the voltage signal VHV2, and outputs the voltage signal VHV3 to the drain terminal of the transistor M3. In other words, the bootstrap circuit BS outputs the voltage signal VHV3 corresponding to the voltage signal VHV2 and the amplified modulation signal AMS1, which is obtained by level-shifting the reference potential of the amplified modulation signal AMS1 based on the voltage vhv2.

Here, an operation of the gate drive circuit 730 will be described. The gate drive circuit 730 includes gate drivers 731 and 732. As described above, the reference level switching signal LS is input to the gate driver 731, and a signal in which the logic level of the reference level switching signal LS is inverted by the inverter 721 is input to the gate driver 732. That is, the signal input to the gate driver 731 and the signal input to the gate driver 732 are exclusively at the H level. Here, being H level exclusively includes the fact that the H level signals are not simultaneously input to the gate driver 731 and the gate driver 732. That is, the case where the L level signals are simultaneously input to the gate driver 731 and the gate driver 732 is not excluded.

The power supply terminal of the gate driver 731 on the low potential side is coupled to the midpoint CP2. Therefore, the signal generated at the midpoint CP2 is supplied to the power supply terminal of the gate driver 731 on the low potential side as the voltage signal HVS2. In addition, the power supply terminal of the gate driver 731 on the high potential side is electrically coupled to the cathode terminal of the diode D11 and one end of the capacitor C11. In addition, a voltage vm is supplied to the anode terminal of the diode D11, and the other end of the capacitor C11 is electrically coupled to the midpoint CP2. That is, the diode D11 and the capacitor C11 form a bootstrap circuit, and the output voltage of the bootstrap circuit is supplied to the power supply terminal of the gate driver 731 on the high potential side. That is, the voltage signal HVD2 having a voltage value higher than the voltage signal HVS2 by a voltage vm input to the power supply terminal of the gate driver 731 on the low potential side is supplied to the power supply terminal of the gate driver 731 on the high potential side. Therefore, when the H level reference level switching signal LS is input to the gate driver 731, the gate driver 731 outputs the gate signal HGD2 having a voltage value based on the voltage signal HVD2 which is higher than the voltage value of the midpoint CP2 by a voltage vm. When the L level reference level switching signal LS is input to the gate driver 731, the gate driver 731 outputs the gate signal HGD2 having a voltage value based on the voltage signal HVS2 which is the voltage value of the midpoint CP2.

The power supply terminal of the gate driver 732 on the low potential side is coupled to the midpoint CP1. Therefore, the amplified modulation signal AMS1 which is the signal generated at the midpoint CP1 is supplied as the voltage signal LVS2 to the power supply terminal of the gate driver 732 on the low potential side. In addition, the power supply terminal of the gate driver 732 on the high potential side is electrically coupled to the cathode terminal of the diode D12 and one end of the capacitor C12. In addition, a voltage vm is supplied to the anode terminal of the diode D12, and the other end of the capacitor C12 is electrically coupled to the midpoint CP1. That is, the diode D12 and the capacitor C12 form a bootstrap circuit, and the output voltage of the bootstrap circuit is supplied to the power supply terminal of the gate driver 732 on the high potential side. That is, the voltage signal LVD2 having a voltage value higher than the voltage signal LVS2 by a voltage vm input to the power supply terminal of the gate driver 732 on the low potential side is supplied to the power supply terminal of the gate driver 732 on the high potential side. Therefore, when an H level signal in which the logic level of the L level reference level switching signal LS is inverted by the inverter 721 is input to the gate driver 732, the gate driver 732 outputs a gate signal LGD2 having a voltage value based on the voltage signal LVD2 which is higher than the voltage value at the midpoint CP1 by a voltage vm. When an L level signal in which the logic level of the H level reference level switching signal LS is inverted by the inverter 721 is input to the gate driver 732, the gate driver 732 outputs a gate signal HGD2 having a voltage value based on the voltage signal LVS2 having a voltage value at the midpoint CP1.

As described above, the gate drive circuit 730 outputs the gate signal HGD2 and the gate signal LGD2 according to the logic level of the reference level switching signal LS. In addition, as described above, the logic level of the reference level switching signal LS is defined by whether or not the voltage value defined by the base drive signal aA input to the reference level switching circuit 710 is equal to or higher than a predetermined threshold voltage. That is, the gate drive circuit 730 outputs the gate signal HGD2 and the gate signal LGD2 based on the base drive signals dA and aA.

In the level shift circuit 70 configured as described above, when the drain terminal and the source terminal of the transistor M3 are controlled to be non-conductive based on the L level gate signal HGD2, and the drain terminal and the source terminal of the transistor M4 are controlled to be conductive based on the H level gate signal LGD2, that is, when the reference level switching circuit 710 outputs the L level reference level switching signal LS based on the base drive signal aA, the midpoint CP1 of the amplification circuit 550 and the midpoint CP2 of the level shift circuit 70 are electrically coupled to each other via the transistor M4. Therefore, the level shift circuit 70 outputs the amplified modulation signal AMS1 supplied to the midpoint CP2 via the transistor M4 as the level shift amplified modulation signal AMS2.

On the other hand, when the drain terminal and the source terminal of the transistor M3 are controlled to be conductive based on the H level gate signal HGD2, and the drain terminal and the source terminal of the transistor M4 are controlled to be non-conductive based on the L level gate signal LGD2, that is, when the reference level switching circuit 710 outputs the H level reference level switching signal LS based on the base drive signal aA, the midpoint CP1 of the amplification circuit 550 and the midpoint CP2 of the level shift circuit 70 are electrically coupled via the bootstrap circuit BS and the transistor M3. Therefore, the level shift circuit 70 outputs the voltage signal VHV3 obtained by level-shifting the reference potential of the amplified modulation signal AMS1 based on the voltage vhv2 of the voltage signal VHV2 as the level shift amplified modulation signal AMS2.

That is, in the level shift circuit 70, when the voltage value defined by the base drive signal dA is lower than the predetermined threshold voltage, the transistor M3 is controlled to be non-conductive, and the transistor M4 is controlled to be conductive, so that in the level shift amplified modulation signal AMS2 having a reference potential of the amplified modulation signal AMS1 as a ground potential, the amplified modulation signal AMS1 is output as the level shift amplified modulation signal AMS2. When the voltage value defined by the base drive signal dA is higher than the predetermined threshold voltage, the transistor M3 is controlled to be conductive and the transistor M4 is controlled to be non-conductive, so that a signal obtained by level-shifting the reference potential of the amplified modulation signal AMS1 to a voltage value based on the voltage vhv2 of the voltage signal VHV2 higher than the ground potential is output as the level shift amplified modulation signal AMS2.

Here, in the following description, an operation mode in which the level shift circuit 70 outputs the amplified modulation signal AMS1 as the level shift amplified modulation signal AMS2 is referred to as a first mode MD1, and an operation mode in which the level shift circuit 70 outputs the level shift amplified modulation signal AMS2 obtained by level-shifting the reference potential of the amplified modulation signal AMS1 to a voltage value based on the voltage vhv2, which is the voltage value of the voltage signal VHV2, is referred to as a second mode MD2. That is, in the level shift circuit 70, when the voltage value defined by the base drive signals dA and aA is the first voltage value lower than the predetermined threshold voltage, the level shift circuit 70 is in the first mode MD1, and when the voltage value defined by the base drive signals dA and aA is a second voltage value higher than the predetermined threshold voltage, the level shift circuit 70 is in the second mode MD2.

The voltage detection circuit 760 detects the voltage value of the capacitor C13 included in the bootstrap circuit BS, and outputs a voltage detection signal VCAP indicating the detection result to the reference level switching circuit 710.

Specifically, a voltage value at one end of the capacitor C13 and a voltage value at the other end of the capacitor C13 are input to the voltage detection circuit 760. The voltage detection circuit 760 calculates the difference between the input voltage value at one end of the capacitor C13 and the voltage value at the other end of the capacitor C13. The voltage detection circuit 760 generates a voltage detection signal VCAP at a logic level according to whether or not the calculated difference is equal to or higher than a predetermined threshold value. Such a voltage detection circuit 760 includes an operational amplifier for calculating the difference between the voltage value at one end of the capacitor C13 and the voltage value at the other end of the capacitor C13, a comparator for determining whether or not the potential difference between both ends of the capacitor C13 is equal to or higher than a predetermined threshold value, and the like. In other words, the voltage detection circuit 760 includes a comparator. The voltage detection circuit 760 outputs the output of the comparator to the reference level switching circuit 710 as the voltage detection signal VCAP.

Here, the voltage detection circuit 760 of the present embodiment will be described as outputting an H level voltage detection signal VCAP when the difference between the voltage value at one end of the capacitor C13 and the voltage value at the other end of the capacitor C13 is equal to or higher than a predetermined threshold value, and outputting an L level voltage detection signal VCAP when the difference between the voltage value at one end of the capacitor C13 and the voltage value at the other end of the capacitor C13 is less than a predetermined threshold value. That is, the voltage detection circuit 760 of the present embodiment will be described as outputting an H level voltage detection signal VCAP when the voltage at both ends of the capacitor C13 and the amount of charge stored in the capacitor C13 are equal to or higher than a predetermined threshold value, and outputting the L level voltage detection signal VCAP when the voltage at both ends of the capacitor C13 and the amount of charge stored in the capacitor C13 are less than a predetermined threshold value. The logic level of the voltage detection signal VCAP output by the voltage detection circuit 760 is not limited to the above-described content, and the voltage detection signal VCAP output by the voltage detection circuit 760 may be a signal including a predetermined command.

The reference level switching circuit 710 switches the logic level of the reference level switching signal LS according to the logic level of the input voltage detection signal VCAP.

Specifically, the reference level switching circuit 710 acquires and holds the logic level of the voltage detection signal VCAP when the voltage value defined by the input base drive signal aA is less than the predetermined threshold value, and preferably during a period in which the voltage value of drive signal COM defined by the base drive signal aA is constant. Thereafter, since the voltage value defined by the base drive signal aA input to the reference level switching circuit 710 is equal to or higher than a predetermined threshold value, the reference level switching circuit 710 switches the logic level of the output reference level switching signal LS from L level to H level. That is, the operation mode of the level shift circuit 70 is switched from the first mode MD1 to the second mode MD2. Immediately after the reference level switching circuit 710 switches the operation mode of the level shift circuit 70 from the first mode MD1 to the second mode MD2, and specifically, switches the logic level of the reference level switching signal LS from the L level to the H level, from the viewpoint of reducing the waveform distortion of the drive signal COM that may occur due to the switching of the operation mode, the reference level switching circuit 710 outputs a pulse signal whose logic level is L level for a short period of time one or a plurality of times, as the reference level switching signal LS. The number of times the pulse signal output by the reference level switching circuit 710 is output is defined by the logic level of the voltage detection signal VCAP input from the voltage detection circuit 760.

On the other hand, the reference level switching circuit 710 acquires and holds the logic level of the voltage detection signal VCAP when the voltage value defined by the input base drive signal aA is equal to or higher than the predetermined threshold value, and preferably during a period in which the voltage value of drive signal COM defined by the base drive signal aA is constant. Thereafter, since the voltage value defined by the base drive signal aA input to the reference level switching circuit 710 is less than a predetermined threshold value, the reference level switching circuit 710 switches the logic level of the output reference level switching signal LS from H level to L level. That is, the operation mode of the level shift circuit 70 is switched from the second mode MD2 to the first mode MD1. Immediately after the reference level switching circuit 710 switches the operation mode of the level shift circuit 70 from the second mode MD2 to the first mode MD1, and specifically, switches the logic level of the reference level switching signal LS from the H level to the L level, from the viewpoint of reducing the waveform distortion of the drive signal COM that may occur due to the switching of the operation mode, the reference level switching circuit 710 outputs a pulse signal whose logic level is H level for a short period of time one or a plurality of times, as the reference level switching signal LS. The number of times the pulse signal output by the reference level switching circuit 710 is output is defined by the logic level of the voltage detection signal VCAP input from the voltage detection circuit 760.

Here, in the following description, a pulse signal in which the logic level output by the reference level switching circuit 710 is the L level for a short period of time, when the operation mode of the level shift circuit 70 is switched from the first mode MD1 to the second mode MD2, and a pulse signal in which the logic level output by the reference level switching circuit 710 is H level for a short period of time, when the operation mode is switched from the second mode MD2 to the first mode MD1, may be collectively referred to as a counter pulse CP. That is, in the drive circuit 50 of the present embodiment, when the operation mode of the level shift circuit 70 is switched from the first mode MD1 to the second mode MD2, or when the operation mode is switched from the second mode MD2 to the first mode MD1, the reference level switching circuit 710 outputs one or a plurality of counter pulses CP. The number of times of the counter pulse CP output by the reference level switching circuit 710 is defined by the logic level of the voltage detection signal VCAP output by the voltage detection circuit 760.

The level shift amplified modulation signal AMS2 output by the level shift circuit 70 is input to the demodulation circuit 560. The demodulation circuit 560 generates and outputs a drive signal COM by demodulating the level shift amplified modulation signal AMS2 output by the level shift circuit 70 by smoothing the level shift amplified modulation signal AMS2. In other words, the demodulation circuit 560 outputs the drive signal COM by demodulating the level shift amplified modulation signal AMS2.

The demodulation circuit 560 includes an inductor L10 and a capacitor C10. One end of the inductor L10 is electrically coupled to the midpoint CP2. The other end of the inductor L10 is electrically coupled to one end of the capacitor C10. A ground potential is supplied to the other end of the capacitor C10. That is, the inductor L10 and the capacitor C10 form a low-pass filter circuit. As a result, the level shift amplified modulation signal AMS2 output from the level shift circuit 70 is smoothed and output from the drive circuit 50 as a drive signal COM.

The feedback circuit 570 supplies the feedback signal VFB obtained by attenuating the drive signal COM generated by the demodulation circuit 560 to the adder 511. As a result, the drive signal COM output by the demodulation circuit 560 is fed back to the modulation circuit 520. As a result, the accuracy of the signal waveform of the drive signal COM output by the drive circuit 50 is improved. Here, the feedback circuit 570 may feed back a plurality of signals including a signal obtained by attenuating the drive signal COM generated by the demodulation circuit 560 and a signal obtained by attenuating a signal obtained by extracting the high frequency component of the drive signal COM generated by the demodulation circuit 560 as the feedback signal VFB. That is, the feedback circuit 570 may include a plurality of feedback circuits including a circuit that feeds back a signal obtained by attenuating the drive signal COM generated by the demodulation circuit 560 and a circuit that feeds back a signal obtained by attenuating a signal obtained by extracting the high frequency component of the drive signal COM generated by the demodulation circuit 560.

As a result, the high frequency components included in the drive signal COM can be individually fed back. As a result, the drive circuit 50 can self-excited and oscillate based on the high frequency component, and the frequency of the modulation signal MS can be set high enough to sufficiently ensure the accuracy of the drive signal COM. Therefore, the waveform accuracy of the drive signal COM output by the drive circuit 50 is further improved.

3.3 Operation of Drive Signal Output Circuit

Figure 7:
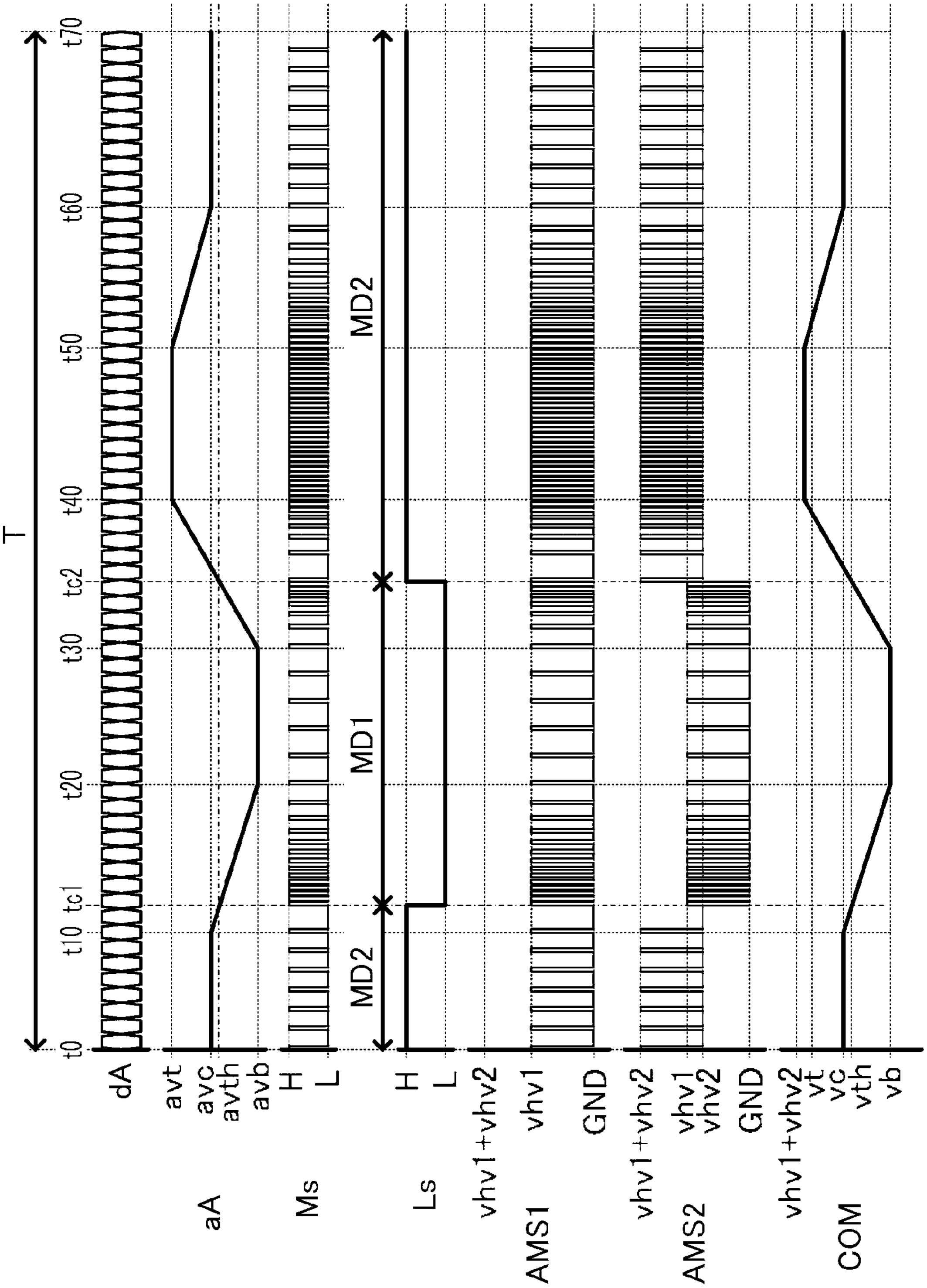
FIG. 7 is a diagram for describing an operation of the drive circuit.

Next, the operation of the drive circuit 50 will be described. FIG. 7 is a diagram for describing the operation of the drive circuit 50. FIG. 7 illustrates only the drive signal COM in any cycle T in the drive signal COM output by the drive circuit 50. In addition, in FIG. 7, a predetermined threshold voltage of the drive signal COM for switching whether the reference level switching circuit 710 outputs the H level reference level switching signal LS or the L level reference level switching signal LS is illustrated as the voltage vth, and the voltage value of the base drive signal aA corresponding to the voltage vth is illustrated as the voltage avth. Furthermore, the voltage value of the base drive signal aA corresponding to the voltage vt of the drive signal COM is illustrated as the voltage avt, the voltage value of the base drive signal aA corresponding to the voltage vb of the drive signal COM is illustrated as the voltage avb, and the voltage value of the base drive signal aA corresponding to the voltage vc of the drive signal COM is illustrated as the voltage avc. FIG. 7 illustrates when the voltage vth is a voltage value lower than the voltage vc and the voltage avth is a voltage value lower than the voltage avc, but the present disclosure is not limited thereto.

As illustrated in FIG. 7, in the period from time t0 to time t10, the drive circuit 50 outputs a constant drive signal COM with the voltage value of voltage vc. Specifically, in the period from time t0 to time t10, the base drive signal dA for generating a constant drive signal COM with the voltage value of voltage vc is input to the base drive signal output circuit 510. Therefore, the base drive signal output circuit 510 generates a constant base drive signal aA at a voltage avc based on the input base drive signal dA. Thereafter, the base drive signal output circuit 510 outputs the generated base drive signal aA to the modulation circuit 520 via the adder 511.

The modulation circuit 520 generates the modulation signal MS by modulating the base drive signal aA output by the base drive signal output circuit 510. The modulation signal MS is input to the gate driver 531 and a signal in which the logic level of the modulation signal MS is inverted is input to the gate driver 532. As a result, the gate drive circuit 530 outputs the gate signal HGD1 corresponding to the logic level of the modulation signal MS and the gate signal LGD1 corresponding to the signal in which the logic level of the modulation signal MS is inverted. The transistors M1 and M2 included in the amplification circuit 550 operate based on the gate signals HGD1 and LGD1, so that the amplified modulation signal AMS1 obtained by amplifying the modulation signal MS based on the voltage vhv1, which is the voltage value of the voltage signal VHV1, is output from the midpoint CP1.

In addition, the base drive signal output circuit 510 also outputs the base drive signal aA to the reference level switching circuit 710 included in the level shift circuit 70. In the period from time t0 to time t10, the voltage value of the drive signal COM is higher than the voltage vth. Therefore, the voltage value of the base drive signal aA is higher than the voltage avth. Therefore, the reference level switching circuit 710 generates the H level reference level switching signal LS. The H level reference level switching signal LS is input to the gate driver 731, and the L level signal in which the logic level is inverted is input to the gate driver 732. As a result, the gate drive circuit 730 outputs the H level gate signal HGD2 and the L level gate signal LGD2.

The transistor M3 is controlled to be conductive by the H level gate signal HGD2 output by the gate drive circuit 730, and the transistor M4 is controlled to be non-conductive by the L level gate signal LGD2. As a result, the level shift amplified modulation signal AMS2 obtained by shifting the reference potential of the amplified modulation signal AMS1 output from the midpoint CP1 of the amplification circuit 550 according to the voltage vhv2, which is the voltage value of the voltage signal VHV2 input to the bootstrap circuit BS, is output from the midpoint CP2. The level shift amplified modulation signal AMS2 output by the level shift circuit 70 is demodulated in the demodulation circuit 560, so that the drive circuit 50 outputs a constant drive signal COM with the voltage value of voltage vc.

In addition, in the period from time t0 to time t10, the reference level switching circuit 710 acquires and holds the voltage detection signal VCAP output by the voltage detection circuit 760. Here, the reference level switching circuit 710 may acquire and hold the logic level of the voltage detection signal VCAP input to the reference level switching circuit 710 at a predetermined timing within the period from the time t0 to the time t10. In addition, the reference level switching circuit 710 may acquire the logic level of the voltage detection signal VCAP a plurality of times in the period from time t0 to time t10, compare the number of acquisitions of the H level voltage detection signals VCAP with the number of acquisitions of the L level voltage detection signals VCAP among the logic levels of the acquired voltage detection signal VCAP, and hold the logic level having the large number of acquisitions. Furthermore, the reference level switching circuit 710 may continuously acquire the logic level of the voltage detection signal VCAP at a predetermined cycle, and hold the logic level of the voltage detection signal VCAP continuously input a plurality of times at the immediate before time t10. When the reference level switching circuit 710 acquires and holds the voltage detection signal VCAP of a new logic level, the reference level switching circuit 710 may abandon the logic level of the voltage detection signal VCAP that is already held.

In the period from time t10 to time t20, the drive circuit 50 outputs a drive signal COM in which the voltage value changes from voltage vc to voltage vb. Specifically, in the period from time t10 to time t20, the base drive signal dA for generating the drive signal COM in which the voltage value changes from the voltage vc to the voltage vb is input to the base drive signal output circuit 510. Therefore, the base drive signal output circuit 510 generates a base drive signal aA in which the voltage value changes from the voltage avc to the voltage avb based on the input base drive signal dA. Thereafter, the base drive signal output circuit 510 outputs the generated base drive signal aA to the modulation circuit 520 via the adder 511.

The modulation circuit 520 generates the modulation signal MS by modulating the base drive signal aA output by the base drive signal output circuit 510. The modulation signal MS is input to the gate driver 531 and a signal in which the logic level of the modulation signal MS is inverted is input to the gate driver 532. As a result, the gate drive circuit 530 outputs the gate signal HGD1 corresponding to the logic level of the modulation signal MS and the gate signal LGD1 corresponding to the signal in which the logic level of the modulation signal MS is inverted. The transistors M1 and M2 included in the amplification circuit 550 operate based on the gate signals HGD1 and LGD1, so that the amplified modulation signal AMS1 obtained by amplifying the modulation signal MS based on the voltage vhv1, which is the voltage value of the voltage signal VHV1, is output from the midpoint CP1.

In addition, the base drive signal output circuit 510 also outputs the base drive signal aA to the reference level switching circuit 710 included in the level shift circuit 70. Within the period from time t10 to time t20, in the period from time t10 to time tc1 in which the voltage value of the drive signal COM is higher than the voltage with and the voltage value of the base drive signal aA is higher than the voltage avth, the reference level switching circuit 710 generates an H level reference level switching signal LS. The H level reference level switching signal LS is input to the gate driver 731, and the L level signal in which the logic level is inverted is input to the gate driver 732. As a result, the gate drive circuit 730 outputs the H level gate signal HGD2 and the L level gate signal LGD2.

The transistor M3 is controlled to be conductive by the H level gate signal HGD2 output by the gate drive circuit 730, and the transistor M4 is controlled to be non-conductive by the L level gate signal LGD2. As a result, the level shift amplified modulation signal AMS2 obtained by shifting the reference potential of the amplified modulation signal AMS1 output from the midpoint CP1 of the amplification circuit 550 according to the voltage vhv2, which is the voltage value of the voltage signal VHV2 input to the bootstrap circuit BS, is output from the midpoint CP2.

Within the period from time t10 to time t20, in the period from time tc1 to time t20 in which the voltage value of the drive signal COM is lower than the voltage with and the voltage value of the base drive signal aA is lower than the voltage avth, the reference level switching circuit 710 generates an L level reference level switching signal LS. The L level reference level switching signal LS is input to the gate driver 731, and an H level signal in which the logic level is inverted is input to the gate driver 732. As a result, the gate drive circuit 730 outputs the L level gate signal HGD2 and the H level gate signal LGD2.

The transistor M3 is controlled to be non-conductive by the L level gate signal HGD2 output by the gate drive circuit 730, and the transistor M4 is controlled to be conductive by the H level gate signal LGD2. As a result, the amplified modulation signal AMS1 output from the midpoint CP1 of the amplification circuit 550 is output from the midpoint CP2 as the level shift amplified modulation signal AMS2. That is, within the period from time t10 to time t20, in the period from time t10 to time tc1, the operation mode of the level shift circuit 70 is the second mode MD2, and within the period from time t10 to time t20, in the period from time tc1 to time t20, the operation mode of the level shift circuit 70 is the first mode MD1. In other words, at time tc1, the operation mode of the level shift circuit 70 transitions from the second mode MD2 to the first mode MD1.

The level shift amplified modulation signal AMS2 output by the level shift circuit 70 is demodulated in the demodulation circuit 560, so that the drive circuit 50 outputs a drive signal COM in which the voltage value changes from the voltage vc to the voltage vb.

Figure 8:
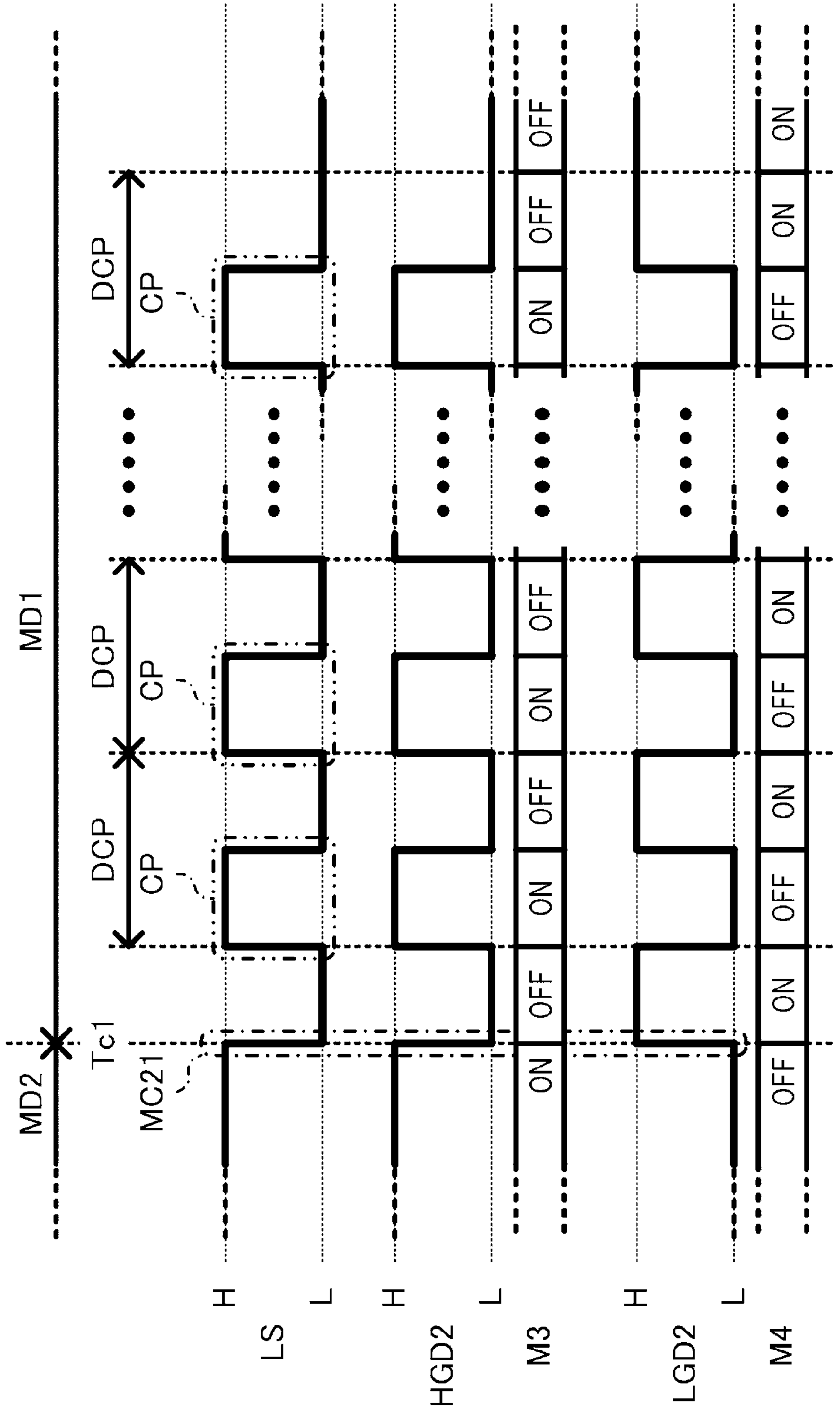
FIG. 8 is a diagram illustrating an example of a counter pulse when transitioning from a second mode to a first mode and an example of an operation of transistors based on the counter pulse.

In addition, at the time Tc1, after the operation mode of the level shift circuit 70 transitions from the second mode MD2 to the first mode MD1, the reference level switching circuit 710 outputs a counter pulse CP that inverts the logic level of the reference level switching signal LS for a short period of time. FIG. 8 is a diagram illustrating an example of the counter pulse CP when transitioning from the second mode MD2 to the first mode MD1 and an example of the operation of the transistors M3 and M4 based on the counter pulse CP.

As illustrated in FIG. 8, before the time Tc1, the level shift circuit 70 operates in the second mode MD2. At this time, the reference level switching circuit 710 outputs the H level reference level switching signal LS, and the gate drive circuit 730 outputs the H level gate signal HGD2 and the L level gate signal LGD2. That is, the transistor M3 is controlled to be conductive, and the transistor M4 is controlled to be non-conductive.

At the time Tc1, the operation mode of the level shift circuit 70 transitions from the second mode MD2 to the first mode MD1. Specifically, the reference level switching circuit 710 switches the logic level of the output reference level switching signal LS from the H level to the L level. As a result, the gate drive circuit 730 outputs the L level gate signal HGD2 and the H level gate signal LGD2. As a result, the transistor M3 is controlled to be non-conductive, and the transistor M4 is controlled to be conductive. That is, when the operation mode of the level shift circuit 70 transitions from the second mode MD2 to the first mode MD1, the gate drive circuit 730 outputs the gate signal HGD2 that controls the transistor M3 to be non-conductive and the gate signal LGD2 that controls the transistor M4 to be conductive from a state where the gate signal HGD2 that controls the transistor M3 to be conductive and the gate signal LGD2 that controls the transistor M4 to be non-conductive are output.

Here, in the following description, the operation in which the gate drive circuit 730 outputs the gate signal HGD2 for controlling the transistor M3 to be non-conductive and the gate signal LGD2 for controlling the transistor M4 to be conductive from a state where the gate signal HGD2 for controlling the transistor M3 to be conductive and the gate signal LGD2 for controlling the transistor M4 to be non-conductive are output, when the operation mode of the level shift circuit 70 transitions from the second mode MD2 to the first mode MD1, is referred to as a mode switching control MC21.

After the mode switching control MC21 is executed, the reference level switching circuit 710 outputs the counter pulse CP one or a plurality of times as the reference level switching signal LS. In other words, after the operation mode of the level shift circuit 70 transitions from the second mode MD2 to the first mode MD1, the reference level switching circuit 710 outputs the counter pulse CP one or a plurality of times.

Specifically, at time Tc1, the reference level switching circuit 710 switches the logic level of the reference level switching signal Ls from the H level to the L level. As a result, the mode switching control MC21 is executed. After the mode switching control MC21, the reference level switching circuit 710 outputs a counter pulse CP in which the logic level of the reference level switching signal LS is set to the L level for a short period of time and then set to the H level again. As a result, the gate drive circuit 730 outputs the gate signal HGD2 that controls the transistor M3 to be conductive and the gate signal LGD2 that controls the transistor M4 to be non-conductive, and then, outputs the gate signal HGD2 that controls the transistor M3 to be non-conductive and the gate signal LGD2 that controls the transistor M4 to be conductive.

Here, in the following description, the operation in which the reference level switching circuit 710 outputs a counter pulse CP in which the logic level of the reference level switching signal LS is set to the L level for a short period of time and then set to the H level again to cause the gate drive circuit 730 to output the gate signal HGD2 that controls the transistor M3 to be conductive and the gate signal LGD2 that controls the transistor M4 to be non-conductive, and then, to output the gate signal HGD2 that controls the transistor M3 to be non-conductive and the gate signal LGD2 that controls the transistor M4 to be conductive, is referred to as a counter pulse control DCP.

The level shift circuit 70 repeats the above-described counter pulse control DCP one or a plurality of times after the mode switching control MC21. When the operation mode of the level shift circuit 70 transitions from the second mode MD2 to the first mode MD1, the reference potential of the amplified modulation signal AMS1 output as the level shift amplified modulation signal AMS2 steeply changes from the potential based on the voltage vhv2 to the ground potential. When the response speed of the drive circuit 50 cannot follow the steep change in the reference potential, the possibility that the signal waveform of the drive signal COM output by the drive circuit 50 is distorted. On the other hand, in the drive circuit 50 of the present embodiment, the reference level switching circuit 710 executes the counter pulse control DCP when the operation mode of the level shift circuit 70 transitions from the second mode MD2 to the first mode MD1. Therefore, the change in the reference potential of the amplified modulation signal AMS1 output as the level shift amplified modulation signal AMS2 is gradual, and as a result, the possibility that the signal waveform of the drive signal COM output by the drive circuit 50 is distorted is reduced.

Furthermore, in the drive circuit 50 of the liquid discharge apparatus 1 of the present embodiment, the number of repetitions in which the level shift circuit 70 executes the counter pulse control DCP is defined by the logic level of the voltage detection signal VCAP acquired and held by the reference level switching circuit 710. In other words, the reference level switching circuit 710 outputs the counter pulse CP, so that the gate drive circuit 730 outputs the gate signal HGD2 for controlling the transistor M3 to be conductive and the gate signal LGD2 for controlling the transistor M4 to be non-conductive. Thereafter, the counter pulse control DCP that outputs the gate signal HGD2 for controlling the transistor M3 to be non-conductive and the gate signal LGD2 for controlling the transistor M4 to be conductive is executed one or a plurality of times according to the voltage value of the capacitor C13 of the bootstrap circuit BS.

As described above, in the period from time t10 to time t20, the drive circuit 50 outputs a drive signal COM in which the voltage value decreases from voltage vc to voltage vb. At this time, the charges stored in the piezoelectric element 60 and the demodulation circuit 560 are released toward the drive circuit 50. That is, the current generated by the release of the charge stored in the piezoelectric element 60 and the demodulation circuit 560 is supplied to the drive circuit 50. In such a period from time t10 to time t20, the level shift circuit 70 executes the counter pulse control DCP, so that in the period in which the gate drive circuit 730 outputs the gate signal HGD2 that controls the transistor M3 to be conductive and the gate signal LGD2 that controls the transistor M4 to be non-conductive, the current supplied to the drive circuit 50 is supplied to the capacitor C13 via the transistor M3. That is, the counter pulse control DCP is executed in the period from time t10 to time t20, so that a regenerative current flows through the capacitor C13 of the bootstrap circuit BS, and as a result, a charge is stored in the capacitor C13.

When the voltage value of the capacitor C13 included in the bootstrap circuit BS is reduced, the reference potential of the amplified modulation signal AMS1 output as the level shift amplified modulation signal AMS2 in the second mode MD2 cannot be sufficiently obtained, and as a result, the possibility that the signal waveform of the drive signal COM output by the drive circuit 50 is distorted. On the other hand, in the drive circuit 50 included in the liquid discharge apparatus 1 of the present embodiment, the voltage value held by the capacitor C13 can be increased by executing the counter pulse control DCP in the period from time t10 to time t20. As a result, the possibility that the signal waveform of the drive signal COM output by the drive circuit 50 is distorted due to the decrease in the voltage value of the capacitor C13 is reduced.

Furthermore, since the number of times of the counter pulse control DCP executed by the level shift circuit 70 in the period from time t10 to time t20 is defined by the voltage value of the capacitor C13 included in the bootstrap circuit BS, the possibility of supplying an excessive charge to the capacitor C13 is reduced even though the capacitor C13 is sufficiently charged. As a result, the possibility of an increase in power consumption associated with the counter pulse control DCP can be reduced, and when sufficient charge is not stored in the capacitor C13, a sufficient charge can be stored in the capacitor C13, so that the possibility that the signal waveform of the drive signal COM output by the drive circuit 50 is distorted is reduced. Therefore, it is preferable that the number of times of the counter pulse control DCP executed by the level shift circuit 70 increases when the voltage value of the capacitor C13 included in the bootstrap circuit BS decreases.

Returning to FIG. 7, in the period from time t20 to time t30, the drive circuit 50 outputs a constant drive signal COM with the voltage value of voltage vb. Specifically, in the period from time t20 to time t30, the base drive signal dA for generating a constant drive signal COM with the voltage value of voltage vb is input to the base drive signal output circuit 510. Therefore, the base drive signal output circuit 510 generates a constant base drive signal aA at a voltage avb based on the input base drive signal dA. Thereafter, the base drive signal output circuit 510 outputs the generated base drive signal aA to the modulation circuit 520 via the adder 511.

The modulation circuit 520 generates the modulation signal MS by modulating the base drive signal aA output by the base drive signal output circuit 510. The modulation signal MS is input to the gate driver 531 and a signal in which the logic level of the modulation signal MS is inverted is input to the gate driver 532. As a result, the gate drive circuit 530 outputs the gate signal HGD1 corresponding to the logic level of the modulation signal MS and the gate signal LGD1 corresponding to the signal in which the logic level of the modulation signal MS is inverted. The transistors M1 and M2 included in the amplification circuit 550 operate based on the gate signals HGD1 and LGD1, so that the amplified modulation signal AMS1 obtained by amplifying the modulation signal MS based on the voltage vhv1, which is the voltage value of the voltage signal VHV1, is output from the midpoint CP1.

In addition, the base drive signal output circuit 510 also outputs the base drive signal aA to the reference level switching circuit 710 included in the level shift circuit 70. In the period from time t20 to time t30, the voltage value of the drive signal COM is lower than the voltage vth. Therefore, the voltage value of the base drive signal aA is lower than the voltage avth. Therefore, the reference level switching circuit 710 generates the L level reference level switching signal LS. The L level reference level switching signal LS is input to the gate driver 731, and an H level signal in which the logic level is inverted is input to the gate driver 732. As a result, the gate drive circuit 730 outputs the L level gate signal HGD2 and the H level gate signal LGD2.

The transistor M3 is controlled to be non-conductive by the L level gate signal HGD2 output by the gate drive circuit 730, and the transistor M4 is controlled to be conductive by the H level gate signal LGD2. As a result, the amplified modulation signal AMS1 output from the midpoint CP1 of the amplification circuit 550 is output from the midpoint CP2 as the level shift amplified modulation signal AMS2. The level shift amplified modulation signal AMS2 output by the level shift circuit 70 is demodulated in the demodulation circuit 560, so that the drive circuit 50 outputs a constant drive signal COM with the voltage value of voltage vb.

In addition, in the period from time t20 to time t30, the reference level switching circuit 710 acquires and holds the voltage detection signal VCAP output by the voltage detection circuit 760. Here, the reference level switching circuit 710 may acquire and hold the logic level of the voltage detection signal VCAP input to the reference level switching circuit 710 at a predetermined timing within the period from the time t20 to the time t30. In addition, the reference level switching circuit 710 may acquire the logic level of the voltage detection signal VCAP a plurality of times in the period from time t20 to time t30, compare the number of acquisitions of the H level voltage detection signals VCAP with the number of acquisitions of the L level voltage detection signals VCAP among the logic levels of the acquired voltage detection signal VCAP, and hold the logic level having the large number of acquisitions. Furthermore, the reference level switching circuit 710 may continuously acquire the logic level of the voltage detection signal VCAP at a predetermined cycle, and hold the logic level of the voltage detection signal VCAP continuously input a plurality of times at the immediate before time t10. When the reference level switching circuit 710 acquires and holds the voltage detection signal VCAP of a new logic level, the reference level switching circuit 710 may abandon the logic level of the voltage detection signal VCAP that is already held.

In the period from time t30 to time t40, the drive circuit 50 outputs a drive signal COM in which the voltage value changes from voltage vb to voltage vt. Specifically, in the period from time t30 to time t40, the base drive signal dA for generating the drive signal COM in which the voltage value changes from the voltage vb to the voltage vt is input to the base drive signal output circuit 510. Therefore, the base drive signal output circuit 510 generates a base drive signal aA in which the voltage value changes from the voltage avb to the voltage avt based on the input base drive signal dA. Thereafter, the base drive signal output circuit 510 outputs the generated base drive signal aA to the modulation circuit 520 via the adder 511.

The modulation circuit 520 generates the modulation signal MS by modulating the base drive signal aA output by the base drive signal output circuit 510. The modulation signal MS is input to the gate driver 531 and a signal in which the logic level of the modulation signal MS is inverted is input to the gate driver 532. As a result, the gate drive circuit 530 outputs the gate signal HGD1 corresponding to the logic level of the modulation signal MS and the gate signal LGD1 corresponding to the signal in which the logic level of the modulation signal MS is inverted. The transistors M1 and M2 included in the amplification circuit 550 operate based on the gate signals HGD1 and LGD1, so that the amplified modulation signal AMS1 obtained by amplifying the modulation signal MS based on the voltage vhv1, which is the voltage value of the voltage signal VHV1, is output from the midpoint CP1.

In addition, the base drive signal output circuit 510 also outputs the base drive signal aA to the reference level switching circuit 710 included in the level shift circuit 70. Within the period from time t30 to time t40, in the period from time t30 to time tc2 in which the voltage value of the drive signal COM is lower than the voltage with and the voltage value of the base drive signal aA is lower than the voltage avth, the reference level switching circuit 710 generates an L level reference level switching signal LS. The L level reference level switching signal LS is input to the gate driver 731, and an H level signal in which the logic level is inverted is input to the gate driver 732. As a result, the gate drive circuit 730 outputs the L level gate signal HGD2 and the H level gate signal LGD2.

The transistor M3 is controlled to be non-conductive by the L level gate signal HGD2 output by the gate drive circuit 730, and the transistor M4 is controlled to be conductive by the H level gate signal LGD2. As a result, the amplified modulation signal AMS1 output from the midpoint CP1 of the amplification circuit 550 is output from the midpoint CP2 as the level shift amplified modulation signal AMS2.

Within the period from time t30 to time t40, in the period from time tc2 to time t40 in which the voltage value of the drive signal COM is higher than the voltage with and the voltage value of the base drive signal aA is higher than the voltage avth, the reference level switching circuit 710 generates an H level reference level switching signal LS. The H level reference level switching signal LS is input to the gate driver 731, and the L level signal in which the logic level is inverted is input to the gate driver 732. As a result, the gate drive circuit 730 outputs the H level gate signal HGD2 and the L level gate signal LGD2.

The transistor M3 is controlled to be conductive by the H level gate signal HGD2 output by the gate drive circuit 730, and the transistor M4 is controlled to be non-conductive by the L level gate signal LGD2. As a result, the level shift amplified modulation signal AMS2 obtained by shifting the reference potential of the amplified modulation signal AMS1 output from the midpoint CP1 of the amplification circuit 550 according to the voltage vhv2, which is the voltage value of the voltage signal VHV2 input to the bootstrap circuit BS, is output from the midpoint CP2. That is, within the period from time t30 to time t40, in the period from time t30 to time tc2, the operation mode of the level shift circuit 70 is the first mode MD1, and within the period from time t30 to time t40, in the period from time tc2 to time t40, the operation mode of the level shift circuit 70 is the second mode MD2. In other words, at time tc2, the operation mode of the level shift circuit 70 transitions from the first mode MD1 to the second mode MD2.

The level shift amplified modulation signal AMS2 output by the level shift circuit 70 is demodulated in the demodulation circuit 560, so that the drive circuit 50 outputs a drive signal COM in which the voltage value changes from the voltage vb to the voltage vt.

Figure 9:
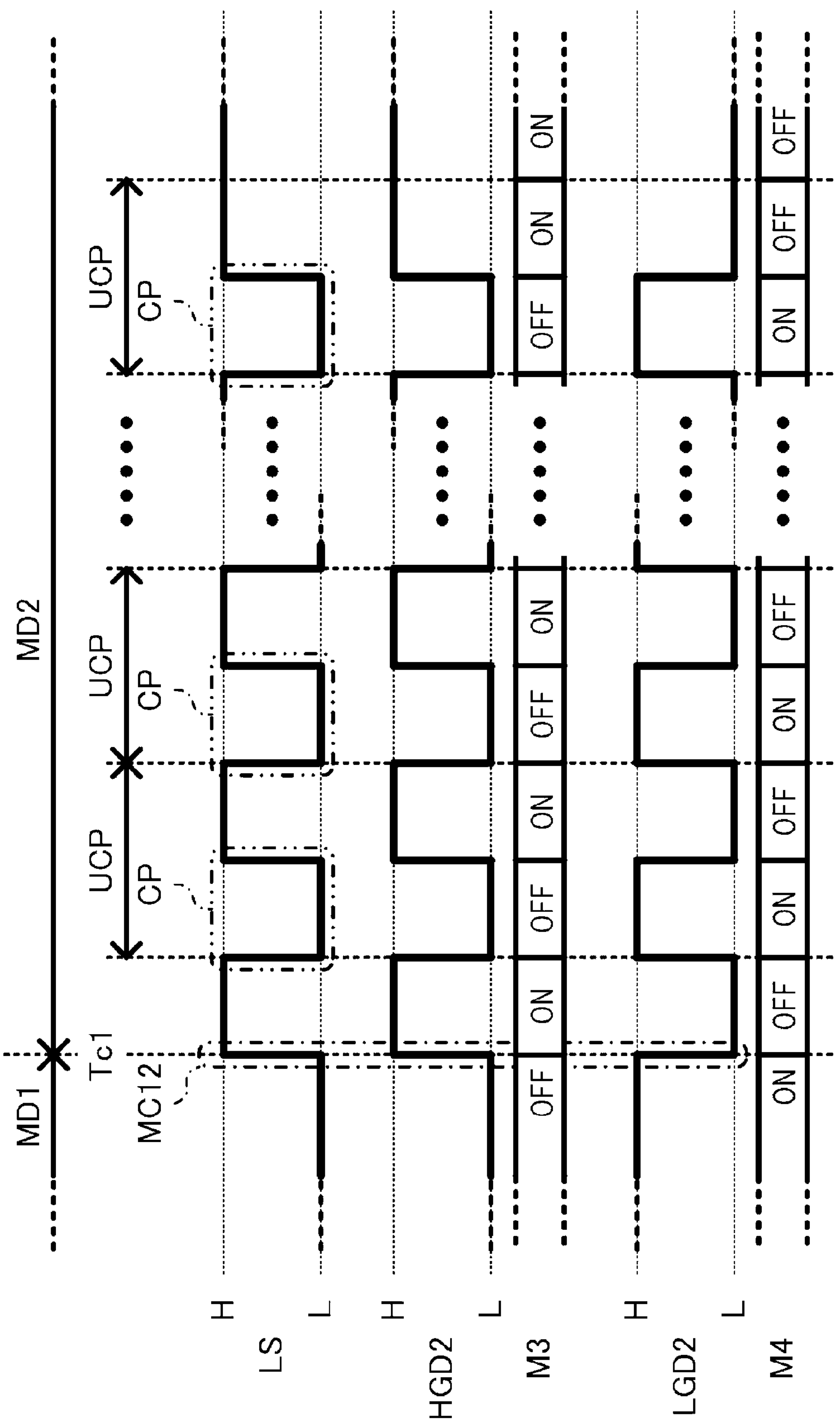
FIG. 9 is a diagram illustrating an example of a counter pulse when transitioning from the first mode to the second mode and an example of an operation of the transistors based on the counter pulse.

In addition, at the time Tc2, after the operation mode of the level shift circuit 70 transitions from the first mode MD1 to the second mode MD2, the reference level switching circuit 710 outputs a counter pulse CP that inverts the logic level of the reference level switching signal LS for a short period of time. FIG. 9 is a diagram illustrating an example of the counter pulse CP when transitioning from the first mode MD1 to the second mode MD2 and an example of the operation of the transistors M3 and M4 based on the counter pulse CP.

As illustrated in FIG. 9, before the time Tc2, the level shift circuit 70 operates in the first mode MD1. At this time, the reference level switching circuit 710 outputs the L level reference level switching signal LS, and the gate drive circuit 730 outputs the L level gate signal HGD2 and the H level gate signal LGD2. That is, the transistor M3 is controlled to be non-conductive, and the transistor M4 is controlled to be conductive.

At the time Tc2, the operation mode of the level shift circuit 70 transitions from the first mode MD1 to the second mode MD2. Specifically, the reference level switching circuit 710 switches the logic level of the output reference level switching signal LS from the L level to the H level. As a result, the gate drive circuit 730 outputs the H level gate signal HGD2 and the L level gate signal LGD2. As a result, the transistor M3 is controlled to be conductive, and the transistor M4 is controlled to be non-conductive. That is, when the operation mode of the level shift circuit 70 transitions from the first mode MD1 to the second mode MD2, the gate drive circuit 730 outputs the gate signal HGD2 that controls the transistor M3 to be conductive, and the gate signal LGD2 that controls the transistor M4 to be non-conductive from a state where the gate signal HGD2 that controls the transistor M3 to be non-conductive, and the gate signal LGD2 that controls the transistor M4 to be conductive are output.

Here, in the following description, the operation in which the gate drive circuit 730 outputs the gate signal HGD2 for controlling the transistor M3 to be conductive and the gate signal LGD2 for controlling the transistor M4 to be non-conductive from a state where the gate signal HGD2 for controlling the transistor M3 to be non-conductive and the gate signal LGD2 for controlling the transistor M4 to be conductive are output, when the operation mode of the level shift circuit 70 transitions from the first mode MD1 to the second mode MD2, is referred to as a mode switching control MC12.

After the mode switching control MC12 is executed, the reference level switching circuit 710 outputs the counter pulse CP one or a plurality of times as the reference level switching signal LS. In other words, after the operation mode of the level shift circuit 70 transitions from the first mode MD1 to the second mode MD2, the reference level switching circuit 710 outputs the counter pulse CP one or a plurality of times.

Specifically, at time Tc2, the reference level switching circuit 710 switches the logic level of the reference level switching signal LS from the L level to the H level. As a result, the mode switching control MC12 is executed. After the mode switching control MC12, the reference level switching circuit 710 outputs a counter pulse CP in which the logic level of the reference level switching signal LS is set to the H level for a short period of time and then set to the L level again. As a result, the gate drive circuit 730 outputs the gate signal HGD2 that controls the transistor M3 to be non-conductive, and the gate signal LGD2 that controls the transistor M4 to be conductive, and then, outputs the gate signal HGD2 that controls the transistor M3 to be conductive and the gate signal LGD2 that controls the transistor M4 to be non-conductive.

Here, in the following description, the operation in which the reference level switching circuit 710 outputs a counter pulse CP in which the logic level of the reference level switching signal LS is set to the H level for a short period of time and then set to the L level again to cause the gate drive circuit 730 to output the gate signal HGD2 that controls the transistor M3 to be non-conductive and the gate signal LGD2 that controls the transistor M4 to be conductive, and then, to output the gate signal HGD2 that controls the transistor M3 to be conductive and the gate signal LGD2 that controls the transistor M4 to be non-conductive, is referred to as a counter pulse control UCP.

The level shift circuit 70 repeats the above-described counter pulse control UCP one or a plurality of times after the mode switching control MC12. When the operation mode of the level shift circuit 70 transitions from the first mode MD1 to the second mode MD2, the reference potential of the amplified modulation signal AMS1 output as the level shift amplified modulation signal AMS2 steeply changes from the ground potential to a potential based on the voltage vhv2. When the response speed of the drive circuit 50 cannot follow the steep change in the reference potential, the possibility that the signal waveform of the drive signal COM output by the drive circuit 50 is distorted. On the other hand, in the drive circuit 50 of the present embodiment, the reference level switching circuit 710 executes the counter pulse control UCP when the operation mode of the level shift circuit 70 transitions from the first mode MD1 to the second mode MD2. Therefore, the change in the reference potential of the amplified modulation signal AMS1 output as the level shift amplified modulation signal AMS2 is gradual. As a result, the possibility that the signal waveform of the drive signal COM output by the drive circuit 50 is distorted is reduced.

Furthermore, in the drive circuit 50 of the liquid discharge apparatus 1 of the present embodiment, the number of repetitions in which the level shift circuit 70 executes the counter pulse control UCP is defined by the logic level of the voltage detection signal VCAP acquired and held by the reference level switching circuit 710. In other words, the reference level switching circuit 710 outputs the counter pulse CP, so that the gate drive circuit 730 outputs the gate signal HGD2 for controlling the transistor M3 to be non-conductive and the gate signal LGD2 for controlling the transistor M4 to be conductive. Thereafter, the counter pulse control UCP that outputs the gate signal HGD2 for controlling the transistor M3 to be conductive and the gate signal LGD2 for controlling the transistor M4 to be non-conductive is executed one or a plurality of times according to the voltage value of the capacitor C13 of the bootstrap circuit BS.

As described above, in the period from time t30 to time t40, the drive circuit 50 outputs a drive signal COM in which the voltage value increases from voltage vb to voltage vt. At this time, a current is supplied to the piezoelectric element 60 and the demodulation circuit 560 by the level shift amplified modulation signal AMS2 output by the drive circuit 50, and charges are stored. The current for storing the charge in the piezoelectric element 60 and the demodulation circuit 560 is supplied via the capacitor C13 included in the drive circuit 50. Therefore, the charge stored in the capacitor C13 is released, and the possibility that the voltage value of the capacitor C13 decreases is increased. In such a period from time t30 to time t40, the level shift circuit 70 executes the counter pulse control UCP, so that in the period in which the gate drive circuit 730 outputs the gate signal HGD2 that controls the transistor M3 to be non-conductive and the gate signal LGD2 that controls the transistor M4 to be conductive, the current is supplied to the piezoelectric element 60 and the demodulation circuit 560 without passing through the capacitor C13 of the bootstrap circuit BS. That is, the counter pulse control UCP is executed in the period from time t30 to time t40, so that the possibility that the charge stored in the capacitor C13 of the bootstrap circuit BS is released is reduced. That is, the possibility that the voltage value of the capacitor C13 included in the bootstrap circuit BS decreases is reduced.

As described above, when the voltage value of the capacitor C13 included in the bootstrap circuit BS decreases, the possibility that the signal waveform of the drive signal COM output by the drive circuit 50 is distorted. On the other hand, in the drive circuit 50 included in the liquid discharge apparatus 1 of the present embodiment, the possibility that the voltage value held by the capacitor C13 decreases is reduced by executing the counter pulse control UCP in the period from time t30 to time t40. As a result, the possibility that the signal waveform of the drive signal COM output by the drive circuit 50 is distorted due to the decrease in the voltage value of the capacitor C13 is reduced.

Furthermore, since the number of times of the counter pulse control UCP executed by the level shift circuit 70 in the period from time t30 to time t40 is defined by the voltage value of the capacitor C13 included in the bootstrap circuit BS, the possibility of an increase in power consumption by executing the counter pulse control UCP can be reduced even though the capacitor C13 is sufficiently charged, and when sufficient charge is not stored in the capacitor C13, the release of the charge stored in the capacitor C13 can be reduced, so that the possibility that the signal waveform of the drive signal COM output by the drive circuit 50 is distorted is reduced. Therefore, it is preferable that the number of times of the counter pulse control UCP executed by the level shift circuit 70 increases when the voltage value of the capacitor C13 included in the bootstrap circuit BS decreases.

Returning to FIG. 7, in the period from time t40 to time t50, the drive circuit 50 outputs a constant drive signal COM with the voltage value of voltage vt. Specifically, in the period from time t40 to time t50, the base drive signal dA for generating a constant drive signal COM with the voltage value of voltage vt is input to the base drive signal output circuit 510. Therefore, the base drive signal output circuit 510 generates a constant base drive signal aA at a voltage avt based on the input base drive signal dA. Thereafter, the base drive signal output circuit 510 outputs the generated base drive signal aA to the modulation circuit 520 via the adder 511.

The modulation circuit 520 generates the modulation signal MS by modulating the base drive signal aA output by the base drive signal output circuit 510. The modulation signal MS is input to the gate driver 531 and a signal in which the logic level of the modulation signal MS is inverted is input to the gate driver 532. As a result, the gate drive circuit 530 outputs the gate signal HGD1 corresponding to the logic level of the modulation signal MS and the gate signal LGD1 corresponding to the signal in which the logic level of the modulation signal MS is inverted. The transistors M1 and M2 included in the amplification circuit 550 operate based on the gate signals HGD1 and LGD1, so that the amplified modulation signal AMS1 obtained by amplifying the modulation signal MS based on the voltage vhv1, which is the voltage value of the voltage signal VHV1, is output from the midpoint CP1.

In addition, the base drive signal output circuit 510 also outputs the base drive signal aA to the reference level switching circuit 710 included in the level shift circuit 70. In the period from the time t40 to the time t50, the voltage value of the drive signal COM is higher than the voltage vth. Therefore, the voltage value of the base drive signal aA is higher than the voltage avth. Therefore, the reference level switching circuit 710 generates the H level reference level switching signal LS. The H level reference level switching signal LS is input to the gate driver 731, and the L level signal in which the logic level is inverted is input to the gate driver 732. As a result, the gate drive circuit 730 outputs the H level gate signal HGD2 and the L level gate signal LGD2.

The transistor M3 is controlled to be conductive by the H level gate signal HGD2 output by the gate drive circuit 730, and the transistor M4 is controlled to be non-conductive by the L level gate signal LGD2. As a result, the level shift amplified modulation signal AMS2 obtained by shifting the reference potential of the amplified modulation signal AMS1 output from the midpoint CP1 of the amplification circuit 550 according to the voltage vhv2, which is the voltage value of the voltage signal VHV2 input to the bootstrap circuit BS, is output from the midpoint CP2. The level shift amplified modulation signal AMS2 output by the level shift circuit 70 is demodulated in the demodulation circuit 560, so that the drive circuit 50 outputs a constant drive signal COM with the voltage value of voltage vb.

In addition, in the period from time t40 to time t50, the reference level switching circuit 710 acquires and holds the voltage detection signal VCAP output by the voltage detection circuit 760. Here, the reference level switching circuit 710 may acquire and hold the logic level of the voltage detection signal VCAP input to the reference level switching circuit 710 at a predetermined timing within the period from the time t40 to the time t50. In addition, the reference level switching circuit 710 may acquire the logic level of the voltage detection signal VCAP a plurality of times in the period from time t40 to time t50, compare the number of acquisitions of the H level voltage detection signals VCAP with the number of acquisitions of the L level voltage detection signals VCAP among the logic levels of the acquired voltage detection signal VCAP, and hold the logic level having the large number of acquisitions. Furthermore, the reference level switching circuit 710 may continuously acquire the logic level of the voltage detection signal VCAP at a predetermined cycle, and hold the logic level of the voltage detection signal VCAP continuously input a plurality of times at the immediate before time t50. When the reference level switching circuit 710 acquires and holds the voltage detection signal VCAP of a new logic level, the reference level switching circuit 710 may abandon the logic level of the voltage detection signal VCAP that is already held.

In the period from time t50 to time t60, the drive circuit 50 outputs a drive signal COM in which the voltage value changes from voltage vt to voltage vc. Specifically, in the period from time t50 to time t60, the base drive signal dA for generating the drive signal COM in which the voltage value changes from the voltage vt to the voltage vc is input to the base drive signal output circuit 510. Therefore, the base drive signal output circuit 510 generates a base drive signal aA that changes from the voltage avt to the voltage avc based on the input base drive signal dA. Thereafter, the base drive signal output circuit 510 outputs the generated base drive signal aA to the modulation circuit 520 via the adder 511.

The modulation circuit 520 generates the modulation signal MS by modulating the base drive signal aA output by the base drive signal output circuit 510. The modulation signal MS is input to the gate driver 531 and a signal in which the logic level of the modulation signal MS is inverted is input to the gate driver 532. As a result, the gate drive circuit 530 outputs the gate signal HGD1 corresponding to the logic level of the modulation signal MS and the gate signal LGD1 corresponding to the signal in which the logic level of the modulation signal MS is inverted. The transistors M1 and M2 included in the amplification circuit 550 operate based on the gate signals HGD1 and LGD1, so that the amplified modulation signal AMS1 obtained by amplifying the modulation signal MS based on the voltage vhv1, which is the voltage value of the voltage signal VHV1, is output from the midpoint CP1.

In addition, the base drive signal output circuit 510 also outputs the base drive signal aA to the reference level switching circuit 710 included in the level shift circuit 70. In the period from time t50 to time t60, the voltage value of the drive signal COM is higher than the voltage vth. Therefore, the voltage value of the base drive signal aA is higher than the voltage avth. Therefore, the reference level switching circuit 710 generates the H level reference level switching signal LS. The H level reference level switching signal LS is input to the gate driver 731, and the L level signal in which the logic level is inverted is input to the gate driver 732. As a result, the gate drive circuit 730 outputs the H level gate signal HGD2 and the L level gate signal LGD2.

The transistor M3 is controlled to be conductive by the H level gate signal HGD2 output by the gate drive circuit 730, and the transistor M4 is controlled to be non-conductive by the L level gate signal LGD2. As a result, the level shift amplified modulation signal AMS2 obtained by shifting the reference potential of the amplified modulation signal AMS1 output from the midpoint CP1 of the amplification circuit 550 according to the voltage vhv2, which is the voltage value of the voltage signal VHV2 input to the bootstrap circuit BS, is output from the midpoint CP2. The level shift amplified modulation signal AMS2 output by the level shift circuit 70 is demodulated in the demodulation circuit 560, so that the drive circuit 50 outputs a drive signal COM in which the voltage value changes from the voltage vt to the voltage vc.

In the period from time t60 to time t70, the drive circuit 50 outputs a constant drive signal COM with the voltage value of voltage vc. Specifically, in the period from time t60 to time t70, the base drive signal dA for generating a constant drive signal COM with the voltage value of voltage vc is input to the base drive signal output circuit 510. Therefore, the base drive signal output circuit 510 generates a constant base drive signal aA at a voltage avc based on the input base drive signal dA. Thereafter, the base drive signal output circuit 510 outputs the generated base drive signal aA to the modulation circuit 520 via the adder 511.

The modulation circuit 520 generates the modulation signal MS by modulating the base drive signal aA output by the base drive signal output circuit 510. The modulation signal MS is input to the gate driver 531 and a signal in which the logic level of the modulation signal MS is inverted is input to the gate driver 532. As a result, the gate drive circuit 530 outputs the gate signal HGD1 corresponding to the logic level of the modulation signal MS and the gate signal LGD1 corresponding to the signal in which the logic level of the modulation signal MS is inverted. The transistors M1 and M2 included in the amplification circuit 550 operate based on the gate signals HGD1 and LGD1, so that the amplified modulation signal AMS1 obtained by amplifying the modulation signal MS based on the voltage vhv1, which is the voltage value of the voltage signal VHV1, is output from the midpoint CP1.

In addition, the base drive signal output circuit 510 also outputs the base drive signal aA to the reference level switching circuit 710 included in the level shift circuit 70. In the period from the time t60 to the time t70, the voltage value of the drive signal COM is higher than the voltage vth. Therefore, the voltage value of the base drive signal aA is higher than the voltage avth. Therefore, the reference level switching circuit 710 generates the H level reference level switching signal LS. The H level reference level switching signal LS is input to the gate driver 731, and the L level signal in which the logic level is inverted is input to the gate driver 732. As a result, the gate drive circuit 730 outputs the H level gate signal HGD2 and the L level gate signal LGD2.

The transistor M3 is controlled to be conductive by the H level gate signal HGD2 output by the gate drive circuit 730, and the transistor M4 is controlled to be non-conductive by the L level gate signal LGD2. As a result, the level shift amplified modulation signal AMS2 obtained by shifting the reference potential of the amplified modulation signal AMS1 output from the midpoint CP1 of the amplification circuit 550 according to the voltage vhv2, which is the voltage value of the voltage signal VHV2 input to the bootstrap circuit BS, is output from the midpoint CP2. The level shift amplified modulation signal AMS2 output by the level shift circuit 70 is demodulated in the demodulation circuit 560, so that the drive circuit 50 outputs a constant drive signal COM with the voltage value of voltage vc.

In addition, in the period from time t60 to time t70, the reference level switching circuit 710 acquires and holds the voltage detection signal VCAP output by the voltage detection circuit 760. Here, the reference level switching circuit 710 may acquire and hold the logic level of the voltage detection signal VCAP input to the reference level switching circuit 710 at a predetermined timing within the period from the time t60 to the time t70. In addition, the reference level switching circuit 710 may acquire the logic level of the voltage detection signal VCAP a plurality of times in the period from time t60 to time t70, compare the number of acquisitions of the H level voltage detection signals VCAP with the number of acquisitions of the L level voltage detection signals VCAP among the logic levels of the acquired voltage detection signal VCAP, and hold the logic level having the large number of acquisitions. Furthermore, the reference level switching circuit 710 may continuously acquire the logic level of the voltage detection signal VCAP at a predetermined cycle, and hold the logic level of the voltage detection signal VCAP continuously input a plurality of times at the immediate before time t70. When the reference level switching circuit 710 acquires and holds the voltage detection signal VCAP of a new logic level, the reference level switching circuit 710 may abandon the logic level of the voltage detection signal VCAP that is already held.

Here, as described above, the drive signal COM includes a signal waveform repeated in the cycle T. That is, the time t70 illustrated in FIG. 7 corresponds to the time t0 described above. As a result, the drive circuit 50 generates and outputs a drive signal COM including a signal waveform in which the voltage value starts at the voltage vc and ends at the voltage vc. In this manner, the reference level switching circuit 710 may acquire and hold the voltage detection signal VCAP output by the voltage detection circuit 760 in the period from time t60 to time t70 and time t0 to time t10. That is, the reference level switching circuit 710 may acquire and hold the logic level of the voltage detection signal VCAP input to the reference level switching circuit 710 at a predetermined timing within the period from time t60 to time t70 and time t0 to time t10. In addition, the reference level switching circuit 710 may acquire the logic level of the voltage detection signal VCAP a plurality of times in the period from time t60 to time t70 and time t0 to time t10, compare the number of acquisitions of the H level voltage detection signals VCAP with the number of acquisitions of the L level voltage detection signals VCAP among the logic levels of the acquired voltage detection signal VCAP, and hold the logic level having the large number of acquisitions. Furthermore, the reference level switching circuit 710 may continuously acquire the logic level of the voltage detection signal VCAP at a predetermined cycle, and hold the logic level of the voltage detection signal VCAP continuously input a plurality of times at the immediate before time t10. When the reference level switching circuit 710 acquires and holds the voltage detection signal VCAP of a new logic level, the reference level switching circuit 710 may abandon the logic level of the voltage detection signal VCAP that is already held.

Here, the piezoelectric element 60 is an example of a capacitive load, and the drive circuit 50 corresponds to a capacitive load drive circuit. Considering that the drive signal COM output by the drive circuit 50 is an example of the drive signal and the drive signal VOUT is generated by selecting or not selecting the signal waveform of the drive signal COM, the drive signal VOUT is also an example of the drive signal. In addition, considering that the base drive signal aA is an example of a base drive signal that is a base of the drive signal COM and the base drive signal aA is a signal obtained by digital-analog conversion of the base drive signal dA, the base drive signal dA is also an example of a base drive signal that is a base of the drive signal COM. In addition, the midpoint CP1 from which the amplification circuit 550 outputs the amplified modulation signal AMS1 is an example of a first output point, and the midpoint CP2 from which the level shift circuit 70 outputs the level shift amplified modulation signal AMS2 is an example of a second output point. In addition, the transistor M1 is an example of a first transistor, the gate signal HGD1 that operates the transistor M1 is an example of a first gate signal, and the voltage signal VHV1 input to the drain terminal of the transistor M1 is an example of a first voltage signal. The transistor M2 is an example of a second transistor, the gate signal LGD1 that operates the transistor M2 is an example of a second gate signal, and the ground potential signal supplied to the source terminal of the transistor M2 is an example of a second voltage signal. The gate drive circuit 530 that outputs the gate signals HGD1 and LGD1 is an example of a first gate drive circuit. In addition, the bootstrap circuit BS is an example of a bootstrap circuit, the voltage signal VHV2 input to the bootstrap circuit BS is an example of a third voltage signal, the voltage signal VHV3 output by the bootstrap circuit BS is an example of a fourth voltage signal, and the capacitor C13 included in the bootstrap circuit BS is an example of a capacitor. In addition, the transistor M3 is an example of a third transistor, the gate signal HGD2 that operates the transistor M3 is an example of a third gate signal, the transistor M2 is an example of a fourth transistor, and the gate signal LGD2 that operates the transistor M2 is an example of a fourth gate signal. The gate drive circuit 730 that outputs the gate signals HGD2 and LGD2 is an example of a second gate drive circuit. In addition, the ground potential is an example of a first potential, and the potential of the voltage vhv2, which is a voltage value of the voltage signal VHV2, is an example of a second potential. In addition, the mode switching control MC12 is an example of a first control, the counter pulse control UCP is an example of a second control, the mode switching control MC21 is an example of a third control, and the counter pulse control DCP is an example of a fourth control.

4. Action and Effect

As described above, in the liquid discharge apparatus 1 of the present embodiment, the drive circuit 50 includes the modulation circuit 520 that outputs the modulation signal MS obtained by modulating the base drive signal aA that is a base of the drive signal COM, the amplification circuit 550 that outputs the amplified modulation signal AMS1 obtained by amplifying the modulation signal MS to the midpoint CP1, the level shift circuit 70 that outputs the level shift amplified modulation signal AMS2 obtained by level-shifting the reference potential of the amplified modulation signal AMS1 to the midpoint CP2, and the demodulation circuit 560 that outputs the drive signal COM by demodulating the level shift amplified modulation signal AMS2.

When the level shift circuit 70 transitions from the first mode MD1 in which the level shift amplified modulation signal AMS2 having a reference potential of the amplified modulation signal AMS1 as the ground potential is output by controlling the transistor M3 to be non-conductive and the transistor M4 to be conductive, to the second mode MD2 in which the amplified modulation signal AMS2 obtained by level-shifting the reference potential of the amplified modulation signal AMS1 to a potential based on the voltage vhv2 higher than the ground potential is output by controlling the transistor M3 to be conductive and the transistor M4 to be non-conductive, the gate drive circuit 730 executes the mode switching control MC12 that outputs the gate signal HGD2 for controlling the transistor M3 to be conductive and the gate signal LGD2 for controlling the transistor M4 to be non-conductive, from the state where the gate signal HGD2 for controlling the transistor M3 to be non-conductive and the gate signal LGD2 for controlling the transistor M4 to be conductive are output. After the mode switching control MC12, the gate drive circuit 730 outputs the gate signal HGD2 for controlling the transistor M3 to be non-conductive and the gate signal LGD2 for controlling the transistor M4 to be conductive, and then executes the counter pulse control UCP that outputs the gate signal HGD2 for controlling the transistor M3 to be conductive and the gate signal LGD2 for controlling the transistor M4 to be non-conductive one or a plurality of times.

As a result, even when the operation mode of the level shift circuit 70 transitions from the first mode MD1 to the second mode MD2, the change in the reference potential of the amplified modulation signal AMS1 output as the level shift amplified modulation signal AMS2 is gradual. As a result, the possibility that the signal waveform of the drive signal COM output by the drive circuit 50 is distorted is reduced.

Furthermore, when the level shift circuit 70 transitions from the first mode MD1 in which the level shift amplified modulation signal AMS2 having a reference potential of the amplified modulation signal AMS1 as the ground potential is output, to the second mode MD2 in which the amplified modulation signal AMS2 obtained by level-shifting the reference potential of the amplified modulation signal AMS1 to a potential based on the voltage vhv2 higher than the ground potential is output, a current is supplied to the piezoelectric element 60 and the demodulation circuit 560 by the level shift amplified modulation signal AMS2 output by the drive circuit 50. Therefore, the possibility that the charge stored in the capacitor C13 included in the bootstrap circuit BS of the drive circuit 50 is reduced, the voltage value of the capacitor C13 is reduced is increased, and the possibility that the signal waveform of the drive signal COM output by the drive circuit 50 is distorted is increased.

On the other hand, when the level shift circuit 70 executes the counter pulse control UCP, the current can be supplied to the piezoelectric element 60 and the demodulation circuit 560 without going through the capacitor C13 included in the bootstrap circuit BS. As a result, the amount of charge released from the capacitor C13 of the bootstrap circuit BS is reduced. That is, the possibility that the voltage value of the capacitor C13 included in the bootstrap circuit BS decreases is reduced. As a result, in the second mode MD2, the potential of the level shift amplified modulation signal AMS2 is stabilized, and the waveform accuracy of the signal waveform of the drive signal COM output by the drive circuit 50 is improved.

Furthermore, the number of times the level shift circuit 70 executes the counter pulse control UCP is defined according to the voltage value of the capacitor C13 detected by the voltage detection circuit 760. As a result, it is possible to reduce an increase in power consumption that may occur due to the execution of the counter pulse control UCP even though a sufficient charge is stored in the capacitor C13, and when sufficient charge is not stored in the capacitor C13, the release of the charge stored in the capacitor C13 is reduced, so that the possibility that the voltage value held in the capacitor C13 decreases is reduced. As a result, the possibility that the signal waveform of the drive signal COM output by the drive circuit 50 is distorted is reduced.

That is, in the liquid discharge apparatus 1 of the present embodiment, when transitioning from the first mode MD1 to the second mode MD2, the counter pulse control UCP is executed one or a plurality of times according to the voltage value held in the capacitor C13. Therefore, the possibility that the signal waveform of the drive signal COM is distorted can be reduced while reducing the possibility that the power consumption increases.

In addition, when the level shift circuit 70 included in the drive circuit 50 in the liquid discharge apparatus 1 of the present embodiment transitions from the second mode MD2 in which the amplified modulation signal AMS2 obtained by level-shifting the reference potential of the amplified modulation signal AMS1 to a potential based on the voltage vhv2 higher than the ground potential is output, to the first mode MD1 in which the level shift amplified modulation signal AMS2 having a reference potential of the amplified modulation signal AMS1 as the ground potential is output, the gate drive circuit 730 executes the mode switching control MC21 that outputs the gate signal HGD2 for controlling the transistor M3 to be non-conductive and the gate signal LGD2 for controlling the transistor M4 to be conductive, from the state where the gate signal HGD2 for controlling the transistor M3 to be conductive and the gate signal LGD2 for controlling the transistor M4 to be non-conductive are output. After the mode switching control MC21, the gate drive circuit 730 outputs the gate signal HGD2 for controlling the transistor M3 to be conductive and the gate signal LGD2 for controlling the transistor M4 to be non-conductive, and then executes the counter pulse control UCP that outputs the gate signal HGD2 for controlling the transistor M3 to be non-conductive and the gate signal LGD2 for controlling the transistor M4 to be conductive one or a plurality of times.

As a result, even when the operation mode of the level shift circuit 70 transitions from the second mode MD2 to the first mode MD1, the change in the reference potential of the amplified modulation signal AMS1 output as the level shift amplified modulation signal AMS2 is gradual. As a result, the possibility that the signal waveform of the drive signal COM output by the drive circuit 50 is distorted is reduced.

Furthermore, when the level shift circuit 70 transitions from the second mode MD2 in which the amplified modulation signal AMS2 obtained by level-shifting the reference potential of the amplified modulation signal AMS1 to a potential based on the voltage vhv2 higher than the ground potential is output, to the first mode MD1 in which the level shift amplified modulation signal AMS2 having a reference potential of the amplified modulation signal AMS1 as the ground potential is output, the charges stored in the piezoelectric element 60 and the demodulation circuit 560 are released toward the drive circuit 50. At this time, the level shift circuit 70 executes the counter pulse control DCP, so that in the period in which the gate drive circuit 730 outputs the gate signal HGD2 that controls the transistor M3 to be conductive and the gate signal LGD2 that controls the transistor M4 to be non-conductive, the current supplied to the drive circuit 50 is supplied to the capacitor C13 via the transistor M3. That is, the counter pulse control DCP is executed, so that a regenerative current flows through the capacitor C13 of the bootstrap circuit BS, and as a result, a charge is stored in the capacitor C13. As a result, the possibility that the voltage value of the capacitor C13 included in the bootstrap circuit BS decreases is reduced, and as a result, the potential of the level shift amplified modulation signal AMS2 in the second mode MD2 is stabilized, and the waveform accuracy of the signal waveform of the drive signal COM output by the drive circuit 50 is improved.

Furthermore, since the number of times of the counter pulse control DCP executed by the level shift circuit 70 is defined by the voltage value of the capacitor C13 included in the bootstrap circuit BS, the possibility that a charge is excessively supplied to the capacitor C13 is reduced even though the capacitor C13 is sufficiently charged, the possibility of an increase in power consumption associated with the counter pulse control DCP is reduced, and when sufficient charge is not stored in the capacitor C13, a sufficient charge can be stored in the capacitor C13 due to the regenerative current. As a result, the possibility that the signal waveform of the drive signal COM output by the drive circuit 50 is distorted is reduced.

That is, in the liquid discharge apparatus 1 of the present embodiment, when transitioning from the second mode MD2 to the first mode MD1, the counter pulse control DCP is executed one or a plurality of times according to the voltage value held in the capacitor C13. Therefore, the possibility that the signal waveform of the drive signal COM is distorted can be reduced while reducing the possibility that the power consumption increases.

5. Modification Example

In the drive circuit 50 of the liquid discharge apparatus 1 of the present embodiment described above, although it is described that the mode switching control MC21 is performed and then the counter pulse control DCP is repeated one or a plurality of times based on the voltage detection signal VCAP in the period from time t10 to time t20, and the mode switching control MC12 is performed and then the counter pulse control UCP is repeated one or a plurality of times based on the voltage detection signal VCAP in the period from time t30 to time t40, either the counter pulse control DCP in the period from time t10 to time t20 or the counter pulse control UCP in the period from time t30 to time t40 may or may not be executed regardless of the number of times of the voltage detection signal VCAP.

In addition, in the drive circuit 50 of the liquid discharge apparatus 1 described above, although it is described that the voltage detection circuit 760 includes the comparator, the comparator generates the logic level signal indicating whether or not the acquired voltage value of the capacitor C13 is equal to or higher than a predetermined threshold value, and the voltage detection circuit 760 outputs the logic level signal to the reference level switching circuit 710 as the voltage detection signal VCAP, the voltage detection circuit 760 may include an analog-to-digital converter, the analog-to-digital converter may generate a digital signal including the acquired voltage value of the capacitor C13, and the voltage detection circuit 760 may output the digital signal to the reference level switching circuit 710 as the voltage detection signal VCAP. At this time, the reference level switching circuit 710 may acquire and hold the voltage detection signal VCAP of the digital signal input at a predetermined timing, and an arithmetic average, a moving average, a weighted average, or the like of the voltage detection signal VCAP of the digital signal input during a predetermined period may be calculated, and the calculation result may be held.

Furthermore, in the drive circuit 50 of the liquid discharge apparatus 1 described above, the cycle T of the drive signal COM output by the drive circuit 50 may be changed according to the voltage value of the capacitor C13 detected by the voltage detection circuit 760, and the number of nozzles driven by the drive signal VOUT based on the drive signal COM may be limited. As a result, the charging efficiency of the capacitor C13 included in the bootstrap circuit BS provided in the drive circuit 50 is improved, and as a result, the possibility that the voltage value of the capacitor C13 decreases is further reduced.

Furthermore, when the voltage value of the capacitor C13 measured by the voltage detection circuit 760 is lower than the predetermined voltage value, the drive circuit 50 of the liquid discharge apparatus 1 described above notifies the control portion 100 of that effect, and the control portion 100 may stop the operation of the drive circuit 50 based on the notification from the drive circuit 50. As a result, when the voltage value of the capacitor C13 is lowered to such an extent that it is difficult to reduce the distortion of the waveform of the drive signal COM, the possibility that the drive circuit 50 continues to operate is reduced.

Furthermore, when the voltage value of the capacitor C13 measured by the voltage detection circuit 760 is lower than the predetermined voltage value, the drive circuit 50 of the liquid discharge apparatus 1 described above notifies the control portion 100 of that effect, and the control portion 100 may cause an external device (not illustrated) provided outside the liquid discharge apparatus 1, such as a host computer, to display the fact that an abnormality occurs in the drive circuit 50. As a result, when the voltage value of the capacitor C13 is lowered to such an extent that it is difficult to reduce the distortion of the waveform of the drive signal COM, it is possible to notify the user of that effect.

Furthermore, in the drive circuit 50 of the liquid discharge apparatus 1 described above, although it is described that the voltage detection circuit 760 measures the voltage value between both terminals of the capacitor C13, the voltage detection circuit 760 may measure the voltage at the cathode terminal of the diode D13 electrically coupled to the capacitor C13. As a result, the configuration of the voltage detection circuit 760 can be simplified, and the drive circuit 50 and the liquid discharge apparatus 1 can be miniaturized and the cost can be reduced.

Although the embodiments have been described above, the present disclosure is not limited to these embodiments, and can be implemented in various embodiments without departing from the gist thereof. For example, the above embodiments can be combined as appropriate.

The present disclosure includes a configuration substantially the same as the configuration described in the embodiments (for example, a configuration having the same function, method, and result, or a configuration having the same object and effect). In addition, the present disclosure also includes a configuration in which a non-essential part of the configuration described in the embodiments is replaced. In addition, the present disclosure also includes a configuration that exhibits the same action and effect as those of the configuration described in the embodiments or a configuration that can achieve the same object. In addition, the present disclosure also includes a configuration in which a known technique is added to the configuration described in the embodiments.

The following contents are derived from the above-described embodiments.

According to an aspect of the present disclosure, there is provided a liquid discharge apparatus including a liquid discharge head that includes a capacitive load driven by being supplied with a drive signal and discharges a liquid by driving the capacitive load, and a capacitive load drive circuit that outputs the drive signal, in which the capacitive load drive circuit includes a modulation circuit that outputs a modulation signal obtained by modulating a base drive signal which is a base of the drive signal, an amplification circuit that outputs an amplified modulation signal obtained by amplifying the modulation signal to a first output point, a level shift circuit that outputs a level shift amplified modulation signal obtained by level-shifting a reference potential of the amplified modulation signal to a second output point, and a demodulation circuit that outputs the drive signal by demodulating the level shift amplified modulation signal, in which the amplification circuit includes a first gate drive circuit that outputs a first gate signal and a second gate signal based on the modulation signal, a first transistor that has one end supplied with a first voltage signal and the other end electrically coupled to the first output point, and operates based on the first gate signal, and a second transistor that has one end electrically coupled to the first output point and the other end supplied with a second voltage signal, and operates based on the second gate signal, the level shift circuit includes a bootstrap circuit that has a capacitor, receives input of a third voltage signal and the amplified modulation signal, and outputs a fourth voltage signal corresponding to the third voltage signal and the amplified modulation signal, a voltage detection circuit that detects a voltage value of the capacitor, a second gate drive circuit that outputs a third gate signal and a fourth gate signal based on the base drive signal, a third transistor that has one end supplied with the fourth voltage signal and the other end electrically coupled to the second output point, and operates based on the third gate signal, and a fourth transistor that has one end electrically coupled to the second output point and the other end supplied with the amplified modulation signal, and operates based on the fourth gate signal, the level shift circuit includes a first mode in which the level shift amplified modulation signal having the reference potential of the amplified modulation signal as a first potential is output by controlling the third transistor to be non-conductive and the fourth transistor to be conductive, and a second mode in which the level shift amplified modulation signal obtained by level-shifting the reference potential of the amplified modulation signal to a second potential higher than the first potential is output by controlling the third transistor to be conductive and the fourth transistor to be non-conductive, and in the level shift circuit, when transitioning from the first mode to the second mode, the second gate drive circuit executes a first control of outputting the third gate signal for controlling the third transistor to be conductive and the fourth gate signal for controlling the fourth transistor to be non-conductive from a state where the third gate signal for controlling the third transistor to be non-conductive and the fourth gate signal for controlling the fourth transistor to be conductive are output, and after the first control, the second gate drive circuit executes, one or a plurality of times according to the voltage value of the capacitor detected by the voltage detection circuit, a second control of outputting the third gate signal for controlling the third transistor to be non-conductive and the fourth gate signal for controlling the fourth transistor to be conductive, and then, outputting the third gate signal for controlling the third transistor to be conductive and the fourth gate signal for controlling the fourth transistor to be non-conductive.

According to this liquid discharge apparatus, in the drive circuit, when transitioning from the first mode in which the level shift amplified modulation signal having the reference potential of the amplified modulation signal as the first potential is output to the second mode in which the level shift amplified modulation signal obtained by level-shifting the reference potential of the amplified modulation signal to the second potential higher than the first potential is output, the second gate drive circuit executes the first control of outputting the third gate signal for controlling the third transistor to be conductive and the fourth gate signal for controlling the fourth transistor to be non-conductive from a state where the third gate signal for controlling the third transistor to be non-conductive and the fourth gate signal for controlling the fourth transistor to be conductive are output, and after the first control, the second gate drive circuit executes, one or a plurality of times according to the voltage value of the capacitor detected by the voltage detection circuit, the second control of outputting the third gate signal for controlling the third transistor to be non-conductive and the fourth gate signal for controlling the fourth transistor to be conductive, and then, outputting the third gate signal for controlling the third transistor to be conductive and the fourth gate signal for controlling the fourth transistor to be non-conductive. As a result, when transitioning from the first mode to the second mode, the possibility that the signal waveform of the drive signal is distorted due to the fluctuation of the reference potential of the amplified modulation signal output as the level shift amplified modulation signal is reduced, and in the second control, the second gate drive circuit outputs the third gate signal that controls the third transistor to be non-conductive and the fourth gate signal that controls the fourth transistor to be conductive, so that the possibility that the electric charge of the capacitor included in the bootstrap circuit is released is reduced. As a result, the possibility that the voltage value held by the capacitor included in the bootstrap circuit decreases is reduced. Therefore, the potential of the level shift amplified modulation signal is stabilized, and the possibility that the signal waveform of the drive signal is distorted is reduced.

Furthermore, since the number of times the second control is executed is defined according to the voltage value of the capacitor detected by the voltage detection circuit, it is possible to control whether or not the charge of the capacitor is released according to the amount of charge stored in the capacitor. As a result, the power consumption of the capacitive load drive circuit is reduced.

That is, according to this liquid discharge apparatus, it is possible to improve the waveform accuracy of the drive signal output by the capacitive load drive circuit and reduce the power consumption of the capacitive load drive circuit.

In an aspect of the liquid discharge apparatus, when the voltage value of the capacitor detected by the voltage detection circuit decreases, the number of times of the second control executed by the level shift circuit may increase.

According to this liquid discharge apparatus, when the voltage value of the capacitor decreases, the number of times of the second control executed by the level shift circuit is increased, so that the possibility that the charge stored in the capacitor is released can be further reduced.

In an aspect of the liquid discharge apparatus, in the level shift circuit, when transitioning from the second mode to the first mode, the second gate drive circuit may execute a third control of outputting the third gate signal for controlling the third transistor to be non-conductive and the fourth gate signal for controlling the fourth transistor to be conductive from a state where the third gate signal for controlling the third transistor to be conductive and the fourth gate signal for controlling the fourth transistor to be non-conductive are output, and after the third control, the second gate drive circuit may execute, one or a plurality of times according to the voltage value of the capacitor detected by the voltage detection circuit, a fourth control of outputting the third gate signal for controlling the third transistor to be conductive and the fourth gate signal for controlling the fourth transistor to be non-conductive, and then, outputting the third gate signal for controlling the third transistor to be non-conductive and the fourth gate signal for controlling the fourth transistor to be conductive.

According to this liquid discharge apparatus, in the drive circuit, when transitioning from the second mode in which the level shift amplified modulation signal obtained by level-shifting the reference potential of the amplified modulation signal to the second potential higher than the first potential is output to the first mode in which the level shift amplified modulation signal having the reference potential of the amplified modulation signal as the first potential is output, the second gate drive circuit executes the third control of outputting the third gate signal for controlling the third transistor to be non-conductive and the fourth gate signal for controlling the fourth transistor to be conductive from a state where the third gate signal for controlling the third transistor to be conductive and the fourth gate signal for controlling the fourth transistor to be non-conductive are output, and after the third control, the second gate drive circuit executes, one or a plurality of times according to the voltage value of the capacitor detected by the voltage detection circuit, the fourth control of outputting the third gate signal for controlling the third transistor to be conductive and the fourth gate signal for controlling the fourth transistor to be non-conductive, and then, outputting the third gate signal for controlling the third transistor to be non-conductive and the fourth gate signal for controlling the fourth transistor to be conductive. As a result, when transitioning from the second mode to the first mode, the possibility that the signal waveform of the drive signal is distorted due to the fluctuation of the reference potential of the amplified modulation signal output as the level shift amplified modulation signal is reduced, and in the fourth control, the second gate drive circuit outputs the third gate signal that controls the third transistor to be conductive and the fourth gate signal that controls the fourth transistor to be non-conductive, so that the capacitor included in the bootstrap circuit is charged by the regenerative current. As a result, the possibility that the voltage value held by the capacitor included in the bootstrap circuit decreases is reduced. Therefore, the potential of the level shift amplified modulation signal is stabilized, and the possibility that the signal waveform of the drive signal is distorted is reduced.

Furthermore, since the number of times the fourth control is executed is defined according to the voltage value of the capacitor detected by the voltage detection circuit, it is possible to control whether or not the charge of the capacitor is charged according to the amount of charge stored in the capacitor, and the power consumption of the capacitive load drive circuit is reduced.

That is, according to this liquid discharge apparatus, it is possible to further improve the waveform accuracy of the drive signal output by the capacitive load drive circuit and further reduce the power consumption of the capacitive load drive circuit.

According to another aspect of the present disclosure, there is provided a liquid discharge apparatus including a liquid discharge head that includes a capacitive load driven by being supplied with a drive signal and discharges a liquid by driving the capacitive load, and a capacitive load drive circuit that outputs the drive signal, in which the capacitive load drive circuit includes a modulation circuit that outputs a modulation signal obtained by modulating a base drive signal which is a base of the drive signal, an amplification circuit that outputs an amplified modulation signal obtained by amplifying the modulation signal to a first output point, a level shift circuit that outputs a level shift amplified modulation signal obtained by level-shifting a reference potential of the amplified modulation signal to a second output point, and a demodulation circuit that outputs the drive signal by demodulating the level shift amplified modulation signal, in which the amplification circuit includes a first gate drive circuit that outputs a first gate signal and a second gate signal based on the modulation signal, a first transistor that has one end supplied with a first voltage signal and the other end electrically coupled to the first output point, and operates based on the first gate signal, and a second transistor that has one end electrically coupled to the first output point and the other end supplied with a second voltage signal, and operates based on the second gate signal, the level shift circuit includes a bootstrap circuit that has a capacitor, receives input of a third voltage signal and the amplified modulation signal, and outputs a fourth voltage signal corresponding to the third voltage signal and the amplified modulation signal, a voltage detection circuit that detects a voltage value of the capacitor, a second gate drive circuit that outputs a third gate signal and a fourth gate signal based on the base drive signal, a third transistor that has one end supplied with the fourth voltage signal and the other end electrically coupled to the second output point, and operates based on the third gate signal, and a fourth transistor that has one end electrically coupled to the second output point and the other end supplied with the amplified modulation signal, and operates based on the fourth gate signal, the level shift circuit includes a first mode in which the level shift amplified modulation signal having the reference potential of the amplified modulation signal as a first potential is output by controlling the third transistor to be non-conductive and the fourth transistor to be conductive, and a second mode in which the level shift amplified modulation signal obtained by level-shifting the reference potential of the amplified modulation signal to a second potential higher than the first potential is output by controlling the third transistor to be conductive and the fourth transistor to be non-conductive, and in the level shift circuit, when transitioning from the second mode to the first mode, the second gate drive circuit executes a third control of outputting the third gate signal for controlling the third transistor to be non-conductive and the fourth gate signal for controlling the fourth transistor to be conductive from a state where the third gate signal for controlling the third transistor to be conductive and the fourth gate signal for controlling the fourth transistor to be non-conductive are output, and after the third control, the second gate drive circuit executes, one or a plurality of times according to the voltage value of the capacitor detected by the voltage detection circuit, a fourth control of outputting the third gate signal for controlling the third transistor to be conductive and the fourth gate signal for controlling the fourth transistor to be non-conductive, and then, outputting the third gate signal for controlling the third transistor to be non-conductive and the fourth gate signal for controlling the fourth transistor to be conductive.

According to this liquid discharge apparatus, in the drive circuit, when transitioning from the second mode in which the level shift amplified modulation signal obtained by level-shifting the reference potential of the amplified modulation signal to the second potential higher than the first potential is output to the first mode in which the level shift amplified modulation signal having the reference potential of the amplified modulation signal as the first potential is output, the second gate drive circuit executes the third control of outputting the third gate signal for controlling the third transistor to be non-conductive and the fourth gate signal for controlling the fourth transistor to be conductive from a state where the third gate signal for controlling the third transistor to be conductive and the fourth gate signal for controlling the fourth transistor to be non-conductive are output, and after the third control, the second gate drive circuit executes, one or a plurality of times according to the voltage value of the capacitor detected by the voltage detection circuit, the fourth control of outputting the third gate signal for controlling the third transistor to be conductive and the fourth gate signal for controlling the fourth transistor to be non-conductive, and then, outputting the third gate signal for controlling the third transistor to be non-conductive and the fourth gate signal for controlling the fourth transistor to be conductive. As a result, when transitioning from the second mode to the first mode, the possibility that the signal waveform of the drive signal is distorted due to the fluctuation of the reference potential of the amplified modulation signal output as the level shift amplified modulation signal is reduced, and in the fourth control, the second gate drive circuit outputs the third gate signal that controls the third transistor to be conductive and the fourth gate signal that controls the fourth transistor to be non-conductive, so that the capacitor included in the bootstrap circuit is charged by the regenerative current. As a result, the possibility that the voltage value held by the capacitor included in the bootstrap circuit decreases is reduced. Therefore, the potential of the level shift amplified modulation signal is stabilized, and the possibility that the signal waveform of the drive signal is distorted is reduced.

Furthermore, since the number of times the fourth control is executed is defined according to the voltage value of the capacitor detected by the voltage detection circuit, it is possible to control whether or not the charge of the capacitor is charged according to the amount of charge stored in the capacitor, and the power consumption of the drive circuit is reduced.

That is, according to this liquid discharge apparatus, it is possible to improve the waveform accuracy of the drive signal output by the drive circuit and reduce the power consumption of the drive circuit.

In an aspect of the liquid discharge apparatus, when the voltage value of the capacitor detected by the voltage detection circuit decreases, the number of times of the fourth control executed by the level shift circuit may increase.

According to this liquid discharge apparatus, when the voltage value of the capacitor decreases, the number of times of the fourth control executed by the level shift circuit is increased, so that the possibility that the charge stored in the capacitor is released can be further reduced.

In an aspect of the liquid discharge apparatus, the voltage detection circuit may include a comparator.

In an aspect of the liquid discharge apparatus, the voltage detection circuit may include an analog-to-digital converter.

In an aspect of the liquid discharge apparatus, the level shift circuit may be in the first mode when a voltage value defined by the base drive signal is a first voltage value, and in the second mode when the voltage value defined by the base drive signal is a second voltage value higher than the first voltage value.

In an aspect of the liquid discharge apparatus, the capacitive load may be a piezoelectric element.

According to still another aspect of the present disclosure, there is provided a capacitive load drive circuit that includes a capacitive load to be driven by being supplied with a drive signal and outputs the drive signal to a liquid discharge head which discharges a liquid by driving the capacitive load, the circuit including a modulation circuit that outputs a modulation signal obtained by modulating a base drive signal which is a base of the drive signal, an amplification circuit that outputs an amplified modulation signal obtained by amplifying the modulation signal to a first output point, a level shift circuit that outputs a level shift amplified modulation signal obtained by level-shifting a reference potential of the amplified modulation signal to a second output point, and a demodulation circuit that outputs the drive signal by demodulating the level shift amplified modulation signal, in which the amplification circuit includes a first gate drive circuit that outputs a first gate signal and a second gate signal based on the modulation signal, a first transistor that has one end supplied with a first voltage signal and the other end electrically coupled to the first output point, and operates based on the first gate signal, and a second transistor that has one end electrically coupled to the first output point and the other end supplied with a second voltage signal, and operates based on the second gate signal, the level shift circuit includes a bootstrap circuit that has a capacitor, receives input of a third voltage signal and the amplified modulation signal, and outputs a fourth voltage signal corresponding to the third voltage signal and the amplified modulation signal, a voltage detection circuit that detects a voltage value of the capacitor, a second gate drive circuit that outputs a third gate signal and a fourth gate signal based on the base drive signal, a third transistor that has one end supplied with the fourth voltage signal and the other end electrically coupled to the second output point, and operates based on the third gate signal, and a fourth transistor that has one end electrically coupled to the second output point and the other end supplied with the amplified modulation signal, and operates based on the fourth gate signal, the level shift circuit includes a first mode in which the level shift amplified modulation signal having the reference potential of the amplified modulation signal as a first potential is output by controlling the third transistor to be non-conductive and the fourth transistor to be conductive, and a second mode in which the level shift amplified modulation signal obtained by level-shifting the reference potential of the amplified modulation signal to a second potential higher than the first potential is output by controlling the third transistor to be conductive and the fourth transistor to be non-conductive, and in the level shift circuit, when transitioning from the first mode to the second mode, the second gate drive circuit executes a first control of outputting the third gate signal for controlling the third transistor to be conductive and the fourth gate signal for controlling the fourth transistor to be non-conductive from a state where the third gate signal for controlling the third transistor to be non-conductive and the fourth gate signal for controlling the fourth transistor to be conductive are output, and after the first control, the second gate drive circuit executes, one or a plurality of times according to the voltage value of the capacitor detected by the voltage detection circuit, a second control of outputting the third gate signal for controlling the third transistor to be non-conductive and the fourth gate signal for controlling the fourth transistor to be conductive, and then, outputting the third gate signal for controlling the third transistor to be conductive and the fourth gate signal for controlling the fourth transistor to be non-conductive.

According to this capacitive load drive circuit, when transitioning from the first mode in which the level shift amplified modulation signal having the reference potential of the amplified modulation signal as the first potential is output to the second mode in which the level shift amplified modulation signal obtained by level-shifting the reference potential of the amplified modulation signal to the second potential higher than the first potential is output, the second gate drive circuit executes the first control of outputting the third gate signal for controlling the third transistor to be conductive and the fourth gate signal for controlling the fourth transistor to be non-conductive from a state where the third gate signal for controlling the third transistor to be non-conductive and the fourth gate signal for controlling the fourth transistor to be conductive are output, and after the first control, the second gate drive circuit executes, one or a plurality of times according to the voltage value of the capacitor detected by the voltage detection circuit, the second control of outputting the third gate signal for controlling the third transistor to be non-conductive and the fourth gate signal for controlling the fourth transistor to be conductive, and then, outputting the third gate signal for controlling the third transistor to be conductive and the fourth gate signal for controlling the fourth transistor to be non-conductive. As a result, when transitioning from the first mode to the second mode, the possibility that the signal waveform of the drive signal is distorted due to the fluctuation of the reference potential of the amplified modulation signal output as the level shift amplified modulation signal is reduced, and in the second control, the second gate drive circuit outputs the third gate signal that controls the third transistor to be non-conductive and the fourth gate signal that controls the fourth transistor to be conductive, so that the possibility that the electric charge of the capacitor included in the bootstrap circuit is released is reduced. As a result, the possibility that the voltage value held by the capacitor included in the bootstrap circuit decreases is reduced. Therefore, the potential of the level shift amplified modulation signal is stabilized, and the possibility that the signal waveform of the drive signal is distorted is reduced.

Furthermore, since the number of times the second control is executed is defined according to the voltage value of the capacitor detected by the voltage detection circuit, it is possible to control whether or not the charge of the capacitor is released according to the amount of charge stored in the capacitor, and as a result, the power consumption is reduced.

That is, according to the capacitive load drive circuit, it is possible to improve the waveform accuracy of the drive signal and reduce the power consumption.

According to still another aspect of the present disclosure, there is provided a capacitive load drive circuit that includes a capacitive load to be driven by being supplied with a drive signal and outputs the drive signal to a liquid discharge head which discharges a liquid by driving the capacitive load, the circuit including a modulation circuit that outputs a modulation signal obtained by modulating a base drive signal which is a base of the drive signal, an amplification circuit that outputs an amplified modulation signal obtained by amplifying the modulation signal to a first output point, a level shift circuit that outputs a level shift amplified modulation signal obtained by level-shifting a reference potential of the amplified modulation signal to a second output point, and a demodulation circuit that outputs the drive signal by demodulating the level shift amplified modulation signal, in which the amplification circuit includes a first gate drive circuit that outputs a first gate signal and a second gate signal based on the modulation signal, a first transistor that has one end supplied with a first voltage signal and the other end electrically coupled to the first output point, and operates based on the first gate signal, and a second transistor that has one end electrically coupled to the first output point and the other end supplied with a second voltage signal, and operates based on the second gate signal, the level shift circuit includes a bootstrap circuit that has a capacitor, receives input of a third voltage signal and the amplified modulation signal, and outputs a fourth voltage signal corresponding to the third voltage signal and the amplified modulation signal, a voltage detection circuit that detects a voltage value of the capacitor, a second gate drive circuit that outputs a third gate signal and a fourth gate signal based on the base drive signal, a third transistor that has one end supplied with the fourth voltage signal and the other end electrically coupled to the second output point, and operates based on the third gate signal, and a fourth transistor that has one end electrically coupled to the second output point and the other end supplied with the amplified modulation signal, and operates based on the fourth gate signal, the level shift circuit includes a first mode in which the level shift amplified modulation signal having the reference potential of the amplified modulation signal as a first potential is output by controlling the third transistor to be non-conductive and the fourth transistor to be conductive, and a second mode in which the level shift amplified modulation signal obtained by level-shifting the reference potential of the amplified modulation signal to a second potential higher than the first potential is output by controlling the third transistor to be conductive and the fourth transistor to be non-conductive, and in the level shift circuit, when transitioning from the second mode to the first mode, the second gate drive circuit executes a third control of outputting the third gate signal for controlling the third transistor to be non-conductive and the fourth gate signal for controlling the fourth transistor to be conductive from a state where the third gate signal for controlling the third transistor to be conductive and the fourth gate signal for controlling the fourth transistor to be non-conductive are output, and after the third control, the second gate drive circuit executes, one or a plurality of times according to the voltage value of the capacitor detected by the voltage detection circuit, a fourth control of outputting the third gate signal for controlling the third transistor to be conductive and the fourth gate signal for controlling the fourth transistor to be non-conductive, and then, outputting the third gate signal for controlling the third transistor to be non-conductive and the fourth gate signal for controlling the fourth transistor to be conductive.

According to this capacitive load drive circuit, when transitioning from the second mode in which the level shift amplified modulation signal obtained by level-shifting the reference potential of the amplified modulation signal to the second potential higher than the first potential is output to the first mode in which the level shift amplified modulation signal having the reference potential of the amplified modulation signal as the first potential is output, the second gate drive circuit executes the third control of outputting the third gate signal for controlling the third transistor to be non-conductive and the fourth gate signal for controlling the fourth transistor to be conductive from a state where the third gate signal for controlling the third transistor to be conductive and the fourth gate signal for controlling the fourth transistor to be non-conductive are output, and after the third control, the second gate drive circuit executes, one or a plurality of times according to the voltage value of the capacitor detected by the voltage detection circuit, the fourth control of outputting the third gate signal for controlling the third transistor to be conductive and the fourth gate signal for controlling the fourth transistor to be non-conductive, and then, outputting the third gate signal for controlling the third transistor to be non-conductive and the fourth gate signal for controlling the fourth transistor to be conductive. As a result, when transitioning from the second mode to the first mode, the possibility that the signal waveform of the drive signal is distorted due to the fluctuation of the reference potential of the amplified modulation signal output as the level shift amplified modulation signal is reduced, and in the fourth control, the second gate drive circuit outputs the third gate signal that controls the third transistor to be conductive and the fourth gate signal that controls the fourth transistor to be non-conductive, so that the capacitor included in the bootstrap circuit is charged by the regenerative current. As a result, the possibility that the voltage value held by the capacitor included in the bootstrap circuit decreases is reduced. Therefore, the potential of the level shift amplified modulation signal is stabilized, and the possibility that the signal waveform of the drive signal is distorted is reduced.

Furthermore, since the number of times the fourth control is executed is defined according to the voltage value of the capacitor detected by the voltage detection circuit, it is possible to control whether or not the charge of the capacitor is charged according to the amount of charge stored in the capacitor, and the power consumption is reduced.

That is, according to the capacitive load drive circuit, it is possible to further improve the waveform accuracy of the output drive signal and further reduce the power consumption.

What is claimed is:

1. A liquid discharge apparatus comprising:
a liquid discharge head that includes a capacitive load driven by being supplied with a drive signal and discharges a liquid by driving the capacitive load; and
a capacitive load drive circuit that outputs the drive signal, wherein
the capacitive load drive circuit includes
a modulation circuit that outputs a modulation signal obtained by modulating a base drive signal which is a base of the drive signal,
an amplification circuit that outputs an amplified modulation signal obtained by amplifying the modulation signal to a first output point,
a level shift circuit that outputs a level shift amplified modulation signal obtained by level-shifting a reference potential of the amplified modulation signal to a second output point, and
a demodulation circuit that outputs the drive signal by demodulating the level shift amplified modulation signal,
the amplification circuit includes
a first gate drive circuit that outputs a first gate signal and a second gate signal based on the modulation signal,
a first transistor that has one end supplied with a first voltage signal and the other end electrically coupled to the first output point, and operates based on the first gate signal, and
a second transistor that has one end electrically coupled to the first output point and the other end supplied with a second voltage signal, and operates based on the second gate signal,
the level shift circuit includes
a bootstrap circuit that has a capacitor, receives input of a third voltage signal and the amplified modulation signal, and outputs a fourth voltage signal corresponding to the third voltage signal and the amplified modulation signal,
a voltage detection circuit that detects a voltage value of the capacitor,
a second gate drive circuit that outputs a third gate signal and a fourth gate signal based on the base drive signal,
a third transistor that has one end supplied with the fourth voltage signal and the other end electrically coupled to the second output point, and operates based on the third gate signal, and
a fourth transistor that has one end electrically coupled to the second output point and the other end supplied with the amplified modulation signal, and operates based on the fourth gate signal,
the level shift circuit includes
a first mode in which the level shift amplified modulation signal having the reference potential of the amplified modulation signal as a first potential is output by controlling the third transistor to be non-conductive and the fourth transistor to be conductive, and
a second mode in which the level shift amplified modulation signal obtained by level-shifting the reference potential of the amplified modulation signal to a second potential higher than the first potential is output by controlling the third transistor to be conductive and the fourth transistor to be non-conductive, and
in the level shift circuit, when transitioning from the first mode to the second mode,
the second gate drive circuit executes a first control of outputting the third gate signal for controlling the third transistor to be conductive and the fourth gate signal for controlling the fourth transistor to be non-conductive from a state where the third gate signal for controlling the third transistor to be non-conductive and the fourth gate signal for controlling the fourth transistor to be conductive are output, and
after the first control, the second gate drive circuit executes, one or a plurality of times according to the voltage value of the capacitor detected by the voltage detection circuit, a second control of outputting the third gate signal for controlling the third transistor to be non-conductive and the fourth gate signal for controlling the fourth transistor to be conductive, and then, outputting the third gate signal for controlling the third transistor to be conductive and the fourth gate signal for controlling the fourth transistor to be non-conductive.

2. The liquid discharge apparatus according to claim 1, wherein when the voltage value of the capacitor detected by the voltage detection circuit decreases, the number of times of the second control executed by the level shift circuit increases.

3. The liquid discharge apparatus according to claim 1, wherein in the level shift circuit, when transitioning from the second mode to the first mode, the second gate drive circuit executes a third control of outputting the third gate signal for controlling the third transistor to be non-conductive and the fourth gate signal for controlling the fourth transistor to be conductive from a state where the third gate signal for controlling the third transistor to be conductive and the fourth gate signal for controlling the fourth transistor to be non-conductive are output, and after the third control, the second gate drive circuit executes, one or a plurality of times according to the voltage value of the capacitor detected by the voltage detection circuit, a fourth control of outputting the third gate signal for controlling the third transistor to be conductive and the fourth gate signal for controlling the fourth transistor to be non-conductive, and then, outputting the third gate signal for controlling the third transistor to be non-conductive and the fourth gate signal for controlling the fourth transistor to be conductive.

4. The liquid discharge apparatus according to claim 3, wherein when the voltage value of the capacitor detected by the voltage detection circuit decreases, the number of times of the fourth control executed by the level shift circuit increases.

5. The liquid discharge apparatus according to claim 1, wherein the voltage detection circuit includes a comparator.

6. The liquid discharge apparatus according to claim 1, wherein the voltage detection circuit includes an analog-to-digital converter.

7. The liquid discharge apparatus according to claim 1, wherein the level shift circuit is in the first mode when a voltage value defined by the base drive signal is a first voltage value, and in the second mode when the voltage value defined by the base drive signal is a second voltage value higher than the first voltage value.

8. The liquid discharge apparatus according to claim 1, wherein the capacitive load is a piezoelectric element.

9. A liquid discharge apparatus comprising:

a liquid discharge head that includes a capacitive load driven by being supplied with a drive signal and discharges a liquid by driving the capacitive load; and a capacitive load drive circuit that outputs the drive signal, wherein the capacitive load drive circuit includes a modulation circuit that outputs a modulation signal obtained by modulating a base drive signal which is a base of the drive signal, an amplification circuit that outputs an amplified modulation signal obtained by amplifying the modulation signal to a first output point, a level shift circuit that outputs a level shift amplified modulation signal obtained by level-shifting a reference potential of the amplified modulation signal to a second output point, and a demodulation circuit that outputs the drive signal by demodulating the level shift amplified modulation signal, the amplification circuit includes a first gate drive circuit that outputs a first gate signal and a second gate signal based on the modulation signal, a first transistor that has one end supplied with a first voltage signal and the other end electrically coupled to the first output point, and operates based on the first gate signal, and a second transistor that has one end electrically coupled to the first output point and the other end supplied with a second voltage signal, and operates based on the second gate signal, the level shift circuit includes a bootstrap circuit that has a capacitor, receives input of a third voltage signal and the amplified modulation signal, and outputs a fourth voltage signal corresponding to the third voltage signal and the amplified modulation signal, a voltage detection circuit that detects a voltage value of the capacitor, a second gate drive circuit that outputs a third gate signal and a fourth gate signal based on the base drive signal, a third transistor that has one end supplied with the fourth voltage signal and the other end electrically coupled to the second output point, and operates based on the third gate signal, and a fourth transistor that has one end electrically coupled to the second output point and the other end supplied with the amplified modulation signal, and operates based on the fourth gate signal, the level shift circuit includes a first mode in which the level shift amplified modulation signal having the reference potential of the amplified modulation signal as a first potential is output by controlling the third transistor to be non-conductive and the fourth transistor to be conductive, and a second mode in which the level shift amplified modulation signal obtained by level-shifting the reference potential of the amplified modulation signal to a second potential higher than the first potential is output by controlling the third transistor to be conductive and the fourth transistor to be non-conductive, and in the level shift circuit, when transitioning from the second mode to the first mode, the second gate drive circuit executes a third control of outputting the third gate signal for controlling the third transistor to be non-conductive and the fourth gate signal for controlling the fourth transistor to be conductive from a state where the third gate signal for controlling the third transistor to be conductive and the fourth gate signal for controlling the fourth transistor to be non-conductive are output, and after the third control, the second gate drive circuit executes, one or a plurality of times according to the voltage value of the capacitor detected by the voltage detection circuit, a fourth control of outputting the third gate signal for controlling the third transistor to be conductive and the fourth gate signal for controlling the fourth transistor to be non-conductive, and then, outputting the third gate signal for controlling the third transistor to be non-conductive and the fourth gate signal for controlling the fourth transistor to be conductive.

10. A capacitive load drive circuit that outputs a drive signal to a liquid discharge head which includes a capacitive load to be driven by being supplied with the drive signal and discharges a liquid by driving the capacitive load, the circuit comprising:

a modulation circuit that outputs a modulation signal obtained by modulating a base drive signal which is a base of the drive signal;

an amplification circuit that outputs an amplified modulation signal obtained by amplifying the modulation signal to a first output point;

a level shift circuit that outputs a level shift amplified modulation signal obtained by level-shifting a reference potential of the amplified modulation signal to a second output point; and a demodulation circuit that outputs the drive signal by demodulating the level shift amplified modulation signal, wherein the amplification circuit includes a first gate drive circuit that outputs a first gate signal and a second gate signal based on the modulation signal, a first transistor that has one end supplied with a first voltage signal and the other end electrically coupled to the first output point, and operates based on the first gate signal, and a second transistor that has one end electrically coupled to the first output point and the other end supplied with a second voltage signal, and operates based on the second gate signal, the level shift circuit includes a bootstrap circuit that has a capacitor, receives input of a third voltage signal and the amplified modulation signal, and outputs a fourth voltage signal corresponding to the third voltage signal and the amplified modulation signal, a voltage detection circuit that detects a voltage value of the capacitor, a second gate drive circuit that outputs a third gate signal and a fourth gate signal based on the base drive signal, a third transistor that has one end supplied with the fourth voltage signal and the other end electrically coupled to the second output point, and operates based on the third gate signal, and a fourth transistor that has one end electrically coupled to the second output point and the other end supplied with the amplified modulation signal, and operates based on the fourth gate signal, the level shift circuit includes a first mode in which the level shift amplified modulation signal having the reference potential of the amplified modulation signal as a first potential is output by controlling the third transistor to be non-conductive and the fourth transistor to be conductive, and a second mode in which the level shift amplified modulation signal obtained by level-shifting the reference potential of the amplified modulation signal to a second potential higher than the first potential is output by controlling the third transistor to be conductive and the fourth transistor to be non-conductive, and in the level shift circuit, when transitioning from the first mode to the second mode, the second gate drive circuit executes a first control of outputting the third gate signal for controlling the third transistor to be conductive and the fourth gate signal for controlling the fourth transistor to be non-conductive from a state where the third gate signal for controlling the third transistor to be non-conductive and the fourth gate signal for controlling the fourth transistor to be conductive are output, and after the first control, the second gate drive circuit executes, one or a plurality of times according to the voltage value of the capacitor detected by the voltage detection circuit, a second control of outputting the third gate signal for controlling the third transistor to be non-conductive and the fourth gate signal for controlling the fourth transistor to be conductive, and then, outputting the third gate signal for controlling the third transistor to be conductive and the fourth gate signal for controlling the fourth transistor to be non-conductive.

11. A capacitive load drive circuit that outputs a drive signal to a liquid discharge head which includes a capacitive load to be driven by being supplied with the drive signal and discharges a liquid by driving the capacitive load, the circuit comprising:

a modulation circuit that outputs a modulation signal obtained by modulating a base drive signal which is a base of the drive signal;

an amplification circuit that outputs an amplified modulation signal obtained by amplifying the modulation signal to a first output point;

a level shift circuit that outputs a level shift amplified modulation signal obtained by level-shifting a reference potential of the amplified modulation signal to a second output point; and a demodulation circuit that outputs the drive signal by demodulating the level shift amplified modulation signal, wherein the amplification circuit includes a first gate drive circuit that outputs a first gate signal and a second gate signal based on the modulation signal, a first transistor that has one end supplied with a first voltage signal and the other end electrically coupled to the first output point, and operates based on the first gate signal, and a second transistor that has one end electrically coupled to the first output point and the other end supplied with a second voltage signal, and operates based on the second gate signal, the level shift circuit includes a bootstrap circuit that has a capacitor, receives input of a third voltage signal and the amplified modulation signal, and outputs a fourth voltage signal corresponding to the third voltage signal and the amplified modulation signal, a voltage detection circuit that detects a voltage value of the capacitor, a second gate drive circuit that outputs a third gate signal and a fourth gate signal based on the base drive signal, a third transistor that has one end supplied with the fourth voltage signal and the other end electrically coupled to the second output point, and operates based on the third gate signal, and a fourth transistor that has one end electrically coupled to the second output point and the other end supplied with the amplified modulation signal, and operates based on the fourth gate signal, the level shift circuit includes a first mode in which the level shift amplified modulation signal having the reference potential of the amplified modulation signal as a first potential is output by controlling the third transistor to be non-conductive and the fourth transistor to be conductive, and a second mode in which the level shift amplified modulation signal obtained by level-shifting the reference potential of the amplified modulation signal to a second potential higher than the first potential is output by controlling the third transistor to be conductive and the fourth transistor to be non-conductive, and in the level shift circuit, when transitioning from the second mode to the first mode, the second gate drive circuit executes a third control of outputting the third gate signal for controlling the third transistor to be non-conductive and the fourth gate signal for controlling the fourth transistor to be conductive from a state where the third gate signal for controlling the third transistor to be conductive and the fourth gate signal for controlling the fourth transistor to be non-conductive are output, and after the third control, the second gate drive circuit executes, one or a plurality of times according to the voltage value of the capacitor detected by the voltage detection circuit, a fourth control of outputting the third gate signal for controlling the third transistor to be conductive and the fourth gate signal for controlling the fourth transistor to be non-conductive, and then, outputting the third gate signal for controlling the third transistor to be non-conductive and the fourth gate signal for controlling the fourth transistor to be conductive.

* * * * *